United States Patent
Baek et al.

(10) Patent No.: US 12,238,688 B2
(45) Date of Patent: Feb. 25, 2025

(54) PACKET DATA CONVERGENCE PROTOCOL (PDCP) PACKET DUPLICATION USING SPLIT CONFIGURATION

(71) Applicant: Samsung Electronics Co., Ltd., Suwon-si (KR)

(72) Inventors: Sangkyu Baek, Suwon-si (KR); Jaehyuk Jang, Suwon-si (KR); Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/345,503

(22) Filed: Jun. 30, 2023

(65) Prior Publication Data
US 2023/0345427 A1    Oct. 26, 2023

Related U.S. Application Data

(63) Continuation of application No. 16/863,238, filed on Apr. 30, 2020, now Pat. No. 11,696,259.

(30) Foreign Application Priority Data

Apr. 30, 2019  (KR) .................. 10-2019-0051000

(51) Int. Cl.
*H04W 72/04* (2023.01)
*H04L 1/1812* (2023.01)
*H04W 72/23* (2023.01)

(52) U.S. Cl.
CPC ........... *H04W 72/04* (2013.01); *H04L 1/1812* (2013.01); *H04W 72/23* (2023.01)

(58) Field of Classification Search
CPC ..... H04W 72/04; H04W 72/23; H04W 80/02; H04W 28/06; H04W 84/042; H04L 1/1812; H04L 1/00
See application file for complete search history.

(56) References Cited

U.S. PATENT DOCUMENTS

2009/0103500 A1    4/2009  Malkamaki et al.
2014/0119198 A1    5/2014  Lee et al.
(Continued)

FOREIGN PATENT DOCUMENTS

CN    101635615 A    1/2010
CN    103918200 A    7/2014
(Continued)

OTHER PUBLICATIONS

Nokia et al.; Configured grant timer(s) for NR-U; 3GPP TSG-RAN WG2 Meeting #105bis; R2-1903713; Apr. 8-12, 2019; Xian, China.
(Continued)

*Primary Examiner* — Rushil P. Sampat
(74) *Attorney, Agent, or Firm* — Jefferson IP Law, LLP

(57) ABSTRACT

Provided herein are a method performed when deactivating a packet duplication and returning to a split bearer operation and an apparatus therefor. The method comprises receiving a radio resource control (RRC) message including information related to a secondary radio link control (RLC) entity for returning to the split bearer operation among more than two RLC entities associated with a packet data convergence protocol (PDCP) entity, wherein the secondary RLC entity belongs to a cell group different from a cell group of a primary RLC entity, and performing the split bearer operation using the primary RLC entity and the secondary RLC entity in case that the packet duplication is deactivated.

20 Claims, 22 Drawing Sheets

(56) References Cited

U.S. PATENT DOCUMENTS

| | | |
|---|---|---|
| 2015/0373680 A1 | 12/2015 | Park et al. |
| 2016/0044641 A1 | 2/2016 | Bai et al. |
| 2018/0020382 A1 | 1/2018 | Kim et al. |
| 2018/0145798 A1 | 5/2018 | Suzuki et al. |
| 2018/0310202 A1* | 10/2018 | Löhr ............... H04W 36/00695 |
| 2019/0075589 A1 | 3/2019 | Jeon et al. |
| 2019/0098682 A1* | 3/2019 | Park .......................... H04L 1/08 |
| 2019/0132771 A1* | 5/2019 | Jheng .................... H04W 76/15 |
| 2019/0190661 A1 | 6/2019 | You et al. |
| 2019/0215719 A1* | 7/2019 | Wei ....................... H04W 28/06 |
| 2019/0393989 A1 | 12/2019 | Jung et al. |
| 2021/0067409 A1* | 3/2021 | Byun .................. H04L 41/0813 |
| 2022/0030616 A1* | 1/2022 | Xiao ..................... H04W 76/15 |
| 2022/0264313 A1 | 8/2022 | Babaei et al. |

FOREIGN PATENT DOCUMENTS

| | | |
|---|---|---|
| CN | 105122858 A | 12/2015 |
| CN | 109479309 A | 3/2019 |
| KR | 10-2010-0060853 A | 6/2010 |
| KR | 10-2019-0143733 A | 12/2019 |
| WO | 2018/027656 A1 | 2/2018 |
| WO | 2018/174456 A1 | 9/2018 |

OTHER PUBLICATIONS

Huawei et al.; Transmission with configured grant for NR-U; 3GPP TSG-RAN WG2 Meeting 105bis; R2-1904958; Apr. 8-12, 2019; Xian, China.
Huawei et al.; Coexistence between configured grant and dynamic grant in NR-U; 3GPP TSG-RAN WG2 Meeting #105bis; R2-1904116; Apr. 8-12, 2019; Xian, China.
Mediatek Inc.; Support indication of the need for TB retransmission; 3GPP TSG-RAN WG2 Meeting #105bis; R2-1903877; Apr. 8-12, 2019; Xian, China.
International Search Report with Written Opinion dated Aug. 31, 2020; International Appln. No. PCT/KR2020/005730.
Chinese Office Action dated Dec. 29, 2023, issued in Chinese Patent Application No. 202080032792.4.
Korean Office Action dated Sep. 9, 2024, issued in Korean Patent Application No. 10-2019-0051000.
Chinese Notice of Allowance dated Sep. 11, 2024, issued in Chinese Patent Application No. 202080032792.4.

* cited by examiner

PACKET DATA CONVERGENCE PROTOCOL (PDCP) PACKET DUPLICATION USING SPLIT CONFIGURATION

CROSS-REFERENCE TO RELATED APPLICATION(S)

This application is a continuation application of prior application Ser. No. 16/863,238, filed on Apr. 30, 2020, now issued as U.S. Pat. No. 11,696,259 which is based on and claims priority under 35 U.S.C. § 119(a) of Korean patent application number KR10-2019-0051000, filed on Apr. 30, 2019, in the Korean Intellectual Property Office, the disclosure of which is incorporated by reference herein in its entirety.

BACKGROUND

1. Field

The disclosure relates to methods and apparatuses for transmitting and receiving data in wireless communication systems.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long-term evolution (post-LTE)' systems. To achieve high data rates, implementation of 5G communication systems in an ultra-high frequency or millimeter-wave (mmWave) band (e.g., a 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas, are being studied. To improve system networks for 5G communication systems, various technologies such as evolved small cells, advanced small cells, cloud radio access networks (cloud RAN), ultra-dense networks, device-to-device (D2D) communication, wireless backhaul, moving networks, cooperative communication, coordinated multi-points (COMP), and interference cancellation, have also been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has also evolved, from a human-based connection network, where humans create and consume information, to the Internet of things (IoT), where distributed elements such as objects exchange information with each other to process the information. In this regard, Internet of Everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC, are being implemented by using 5G communication technology including beamforming, MIMO, and array antennas. Application of a cloud RAN as the above-described big data processing technology is an example of convergence of 5G communication technology and IoT technology.

As various services may be provided according to the foregoing and the development of wireless communication systems, methods for smoothly providing such services are required.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide apparatuses and methods capable of effectively providing services in wireless communication systems.

Additional aspects will be set forth in part in the description which follows and, in part, will be apparent from the description, or may be learned by practice of the presented embodiments.

In accordance with an aspect of the disclosure, a method, performed by a user equipment (UE), of transmitting uplink data is provided. The method includes receiving, from a base station, configuration information for an uplink resource; determining a Hybrid Automatic Repeat Request (HARQ) process based on the configuration information; starting a configured grant timer (CGT) and a configured grant retransmission timer (CGRT) when uplink data corresponding to the HARQ process is transmitted; restarting the CGRT when the uplink data corresponding to the HARQ process is retransmitted; receiving, from the base station, downlink feedback information (DFI); and stopping the CGT and the CGRT based on the DFI indicating whether the base station received the uplink data.

In accordance with an aspect of the disclosure, the CGT stops when the DFI indicates the base station received the uplink data.

In accordance with an aspect of the disclosure, the CGRT stops when the CGT expires.

In accordance with an aspect of the disclosure, the method further includes receiving, from the base station, a dynamic grant, and the starting of the CGT and the CGRT comprises starting the CGT based on the dynamic grant.

In accordance with an aspect of the disclosure, user equipment (UE) for transmitting uplink data is provided. The UE includes a transceiver; and at least one processor coupled to the transceiver and configured to: receive, from a base station, configuration information for an uplink resource; determine a Hybrid Automatic Repeat Request (HARQ) process based on the configuration information; control to start a configured grant timer (CGT) and a configured grant retransmission timer (CGRT) when the uplink data corresponding to the HARQ process is transmitted; control to restart the CGRT when the uplink data corresponding to the HARQ process is retransmitted; receive, from the base station, downlink feedback information (DFI); and control to stop the CGT and the CGRT based on the DFI indicating of whether the base station received the uplink data.

In accordance with an aspect of the disclosure, the at least one processor is further configured to: receive, from the base station, a dynamic grant; and control to start the CGT based on the dynamic grant.

In accordance with an aspect of the disclosure, a method, performed by a base station, of receiving uplink data is provided. The method includes transmitting, to user equipment (UE), configuration information for an uplink resource; receiving, from the UE, the uplink data corresponding to a Hybrid Automatic Repeat Request (HARQ) process, wherein the HARQ process is determined based on the configuration information; and transmitting, to the UE, downlink feedback information (DFI), wherein, based on the DFI, a configured grant timer (CGT) and a configured grant retransmission timer stop.

In accordance with an aspect of the disclosure, the method further includes transmitting, to the UE, a dynamic grant, and wherein the CGT starts based on the dynamic grant.

In accordance with an aspect of the disclosure, a base station for transmitting uplink data is provided. The base station includes a transceiver; and at least one processor coupled to the transceiver and configured to: transmit, to user equipment (UE), configuration information for an uplink resource; and receive, from the UE, the uplink data corresponding to a Hybrid Automatic Repeat Request (HARQ) process, wherein the HARQ process is determined based on the configuration information; and transmit, to the UE, downlink feedback information (DFI), wherein, based on the DFI, a configured grant timer (CGT) and a configured grant retransmission stop.

In accordance with an aspect of the disclosure, the at least one processor is further configured to transmit, to the UE, a dynamic grant, and wherein the CGT starts based on the dynamic grant.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as at least one processor.

Throughout the specification, a layer (or a layer apparatus) may also be referred to as an entity.

In the following description, terms for identifying access nodes, terms referring to network entities, terms referring to messages, terms referring to interfaces between network entities, terms referring to various identification information, and the like are illustrated for convenience of description. Thus, the disclosure is not limited to the terms described below and other terms referring to objects having equivalent technical meanings may be used.

Hereinafter, for convenience of description, the disclosure may use terms and names defined in long-term evolution (LTE) and new radio (NR) standards that are the latest standards defined by the 3rd Generation Partnership Project (3GPP) group among the current communication standards. However, the disclosure is not limited to those terms and names, and may also be similarly applied to systems according to other standards. Particularly, the disclosure may be applied to 3GPP NR (5G mobile communication standards).

Figure 1A:
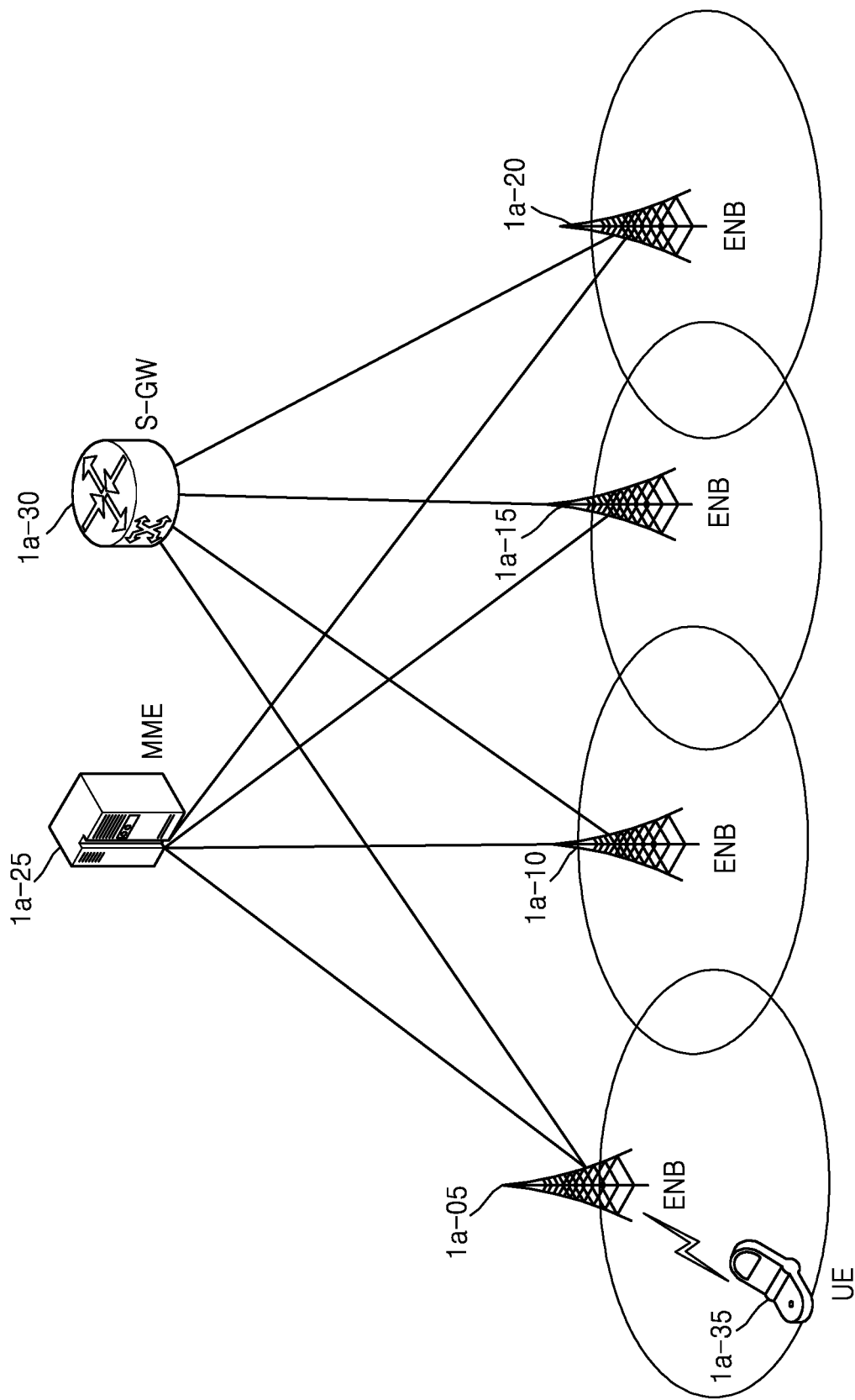
FIG. 1A is a diagram illustrating a structure of a long-term evolution (LTE) system according to an embodiment of the disclosure.

FIG. 1A is a diagram illustrating a structure of an LTE system according to an embodiment of the disclosure. An NR system may have a similar structure.

Referring to FIG. 1A, a wireless communication system may include a plurality of base stations 1a-05, 1a-10, 1a-15, and 1a-20, a mobility management entity (MME) 1a-25, and a serving-gateway (S-GW) 1a-30. A user terminal (e.g., a user equipment (UE) or a terminal) 1a-35 may access an external network through the base stations 1a-05, 1a-10, 1a-15, and 1a-20 and the S-GW 1a-30.

The base stations 1a-05, 1a-10, 1a-15, and 1a-20 may provide radio access to terminals accessing the network as access nodes of a cellular network. That is, in order to service traffic of users, based on state information such as buffer status of UEs, available transmission power status, and/or channel status, the base stations 1a-05, 1a-10, 1a-15, and 1a-20 may perform scheduling and support connection between UEs and a core network (CN). The MME 1a-25 may be an entity performing various control functions as well as a mobility management function for a UE and may be connected to a plurality of base stations, and the S-GW 1a-30 may be an entity providing a data bearer. Also, the MME 1a-25 and the S-GW 1a-30 may perform authentication, bearer management, or the like, for the UE accessing the network and may process packets received from the base stations 1a-05, 1a-10, 1a-15, and 1a-20, or packets to be transmitted to the base stations 1a-05, 1a-10, 1a-15, and 1a-20.

Figure 1B:
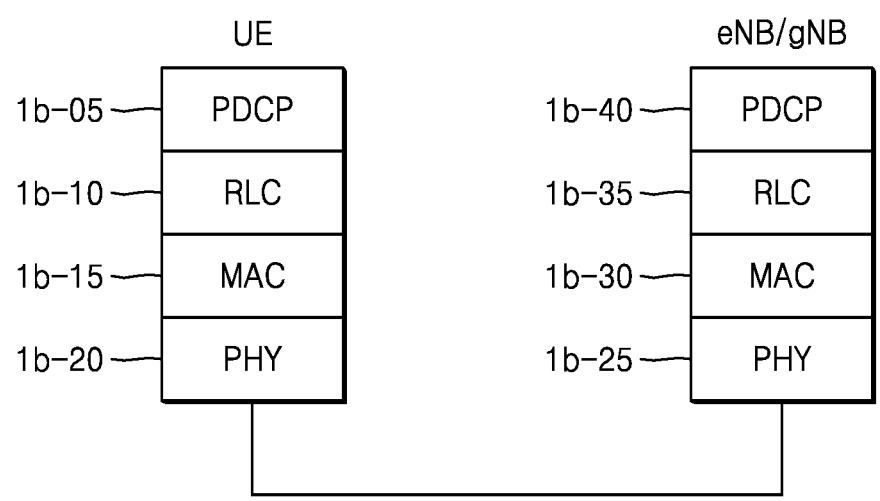
FIG. 1B is a diagram illustrating a radio protocol architecture in LTE and new radio (NR) systems according to an embodiment of the disclosure.

FIG. 1B is a diagram illustrating a radio protocol architecture in LTE and NR systems according to an embodiment of the disclosure.

Referring to FIG. 1B, the radio protocol of the LTE system may include Packet Data Convergence Protocol (PDCP) 1b-05 and 1b-40, Radio Link Control (RLC) 1b-10 and 1b-35, and Medium Access Control (MAC) 1b-15 and 1b-30 in a UE and an eNB, respectively. The PDCP 1b-05 and 1b-40 may perform Internet Protocol (IP) header compression/decompression or the like, and the RLC 1b-10 and 1b-35 may reconstruct a PDCP packet data unit (PDU) in a suitable size. The MAC 1b-15 and 1b-30 may be connected to several RLC layers configured in one UE and may perform an operation of multiplexing RLC PDUs into MAC PDUs and demultiplexing RLC PDUs from MAC PDUs. Physical layers (PHY) 1b-20 and 1b-25 may channel-code and modulate data of a higher layer, generate orthogonal frequency division multiplexing (OFDM) symbols, and transmit the same on radio channels, or may demodulate and channel-decode OFDM symbols received on radio channels and transmit the result thereof to the higher layer. Also, the physical layer may also use a hybrid ARQ (HARQ) for additional error correction, and a receiving end may transmit information about whether the packet transmitted by a transmitting end is received, in 1 bit. This may be referred to as HARQ ACK/NACK information. In the case of LTE, downlink HARQ ACK/NACK information about uplink data transmission may be transmitted by using a physical hybrid-ARQ indicator channel (PHICH) physical channel, and in the case of NR, it may be determined whether retransmission is required or new transmission should be performed through scheduling information of the UE in a physical downlink control channel (PDCCH) that is a channel on which downlink/uplink resource allocation or the like is transmitted. This may be because NR applies an asynchronous HARQ.

Information included in the scheduling information of the PDCCH may include HARQ process identifier (ID), new data indicator (NDI), redundancy version identifier (RVID), or the like. The HARQ process ID (HARQ process identifier) may be transmitted to support a HARQ operation in parallel; for example, in the case of downlink data transmission, even when the ACK of the corresponding data has not yet been received after "HARQ process ID=1" is transmitted, new data having HARQ process ID=2 may be scheduled. In the case of NR, 16 HARQ process IDs may be supported in the uplink. Also, a new data indicator (NDI) may be used to indicate whether the corresponding data is new data. For example, in the case of downlink transmission, a base station may indicate new transmission when an NDI value is 0 for a particular HARQ process ID value and may indicate retransmission when it is 1. Alternatively, it may indicate new retransmission or transmission depending on whether the value itself is equal to or different from the previous value. A redundancy version (RV) may be information indicating which packet among a plurality of duplicate packets generated for retransmission the corresponding packet transmits in the case of packet retransmission.

Uplink HARQ ACK/NACK information about downlink data transmission may be transmitted by using a physical uplink control channel (PUCCH) or a physical uplink shared channel (PUSCH) physical channel.

The PUCCH may be generally transmitted in the uplink of a primary cell (PCell) described below; however, when it is supported by a UE, it may be additionally transmitted to the UE in a secondary cell (SCell) described below, which may be referred to as a PUCCH SCell.

A radio resource control (RRC) layer (not illustrated) may exist above the PDCP layer of the UE and the base station, and the RRC layer may transmit/receive connection and measurement-related control messages for radio resource control.

A PHY layer may include one frequency/carrier or a plurality of frequencies/carriers, and a technology of simultaneously configuring and using a plurality of frequencies may be referred to as carrier aggregation (CA). The CA may mean a technology that may increase the transmission amount by the number of secondary carriers by using one primary carrier and one secondary carrier or a plurality of secondary carriers instead of using only one carrier for communication between a terminal (or UE) and a base station (evolved universal mobile telephone system (UMTS) terrestrial radio access network (E-UTRAN), Node B, or evolved Node B (eNB)). In LTE, a cell in a base station using a primary carrier may be referred to as a main cell or a primary cell (PCell), and a cell in a base station using a secondary carrier may be referred to as a subcell or a secondary cell (SCell).

A scenario in which the above 5G system operates in an unlicensed band may be considered. This system may be referred to as NR-U. Also, the unlicensed band may mean a frequency band that anyone may freely use without a separate license within the regulatory permission at a corresponding frequency. For example, the unlicensed band may include a 2.4 GHz or 5 GHz band, and wireless LAN, Bluetooth, or the like may perform communication by using the corresponding frequency.

In order to perform communication in the unlicensed band, data should be transmitted or received according to the regulation established by each country. In more detail, according to the regulation, before a communication device (e.g., base station and UE) transmits in the unlicensed band, the communication device should 'listen' to determine whether the unlicensed band is occupied by another communication device and then perform 'transmission' when the unlicensed band is determined as being unoccupied. Such a method of listening and then transmitting when the unlicensed band is unoccupied may be referred to as listen-before-talk (LBT). A regulation may be established to perform LBT in each country and unlicensed band, and a communication device should perform LBT according to the regulation when communicating in the unlicensed band.

In general, there may be two types of LBT, Type 1 and Type 2.

Figure 1C:
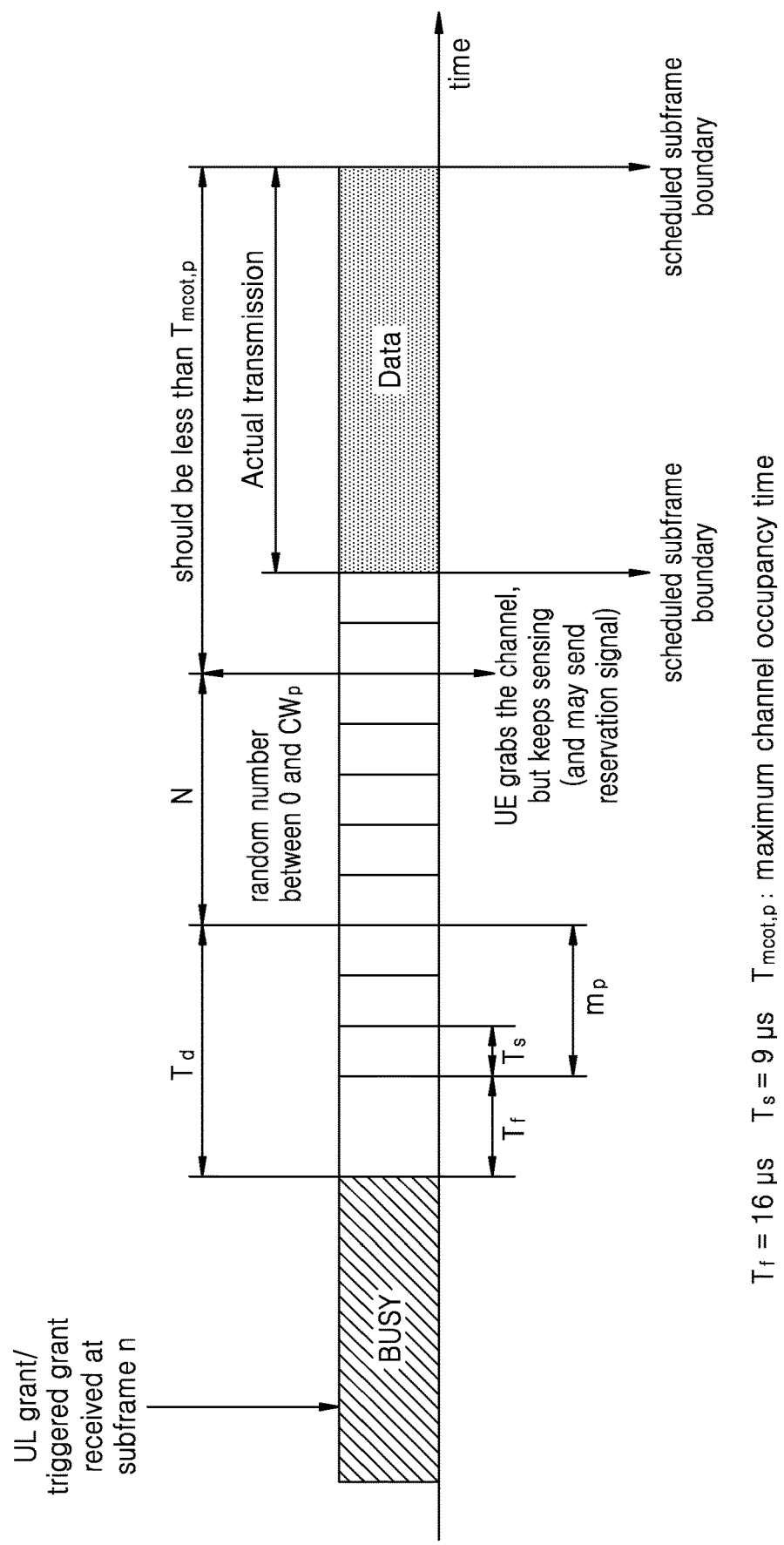
FIG. 1C is a diagram describing listen-before-talk (LBT) Type 1 according to an embodiment of the disclosure.

FIG. 1C is a diagram describing LBT Type 1 according to an embodiment of the disclosure.

Referring to FIG. 1C, LBT Type 1 may be a method of randomly determining a time for listening to whether other peripheral devices transmit before transmission, and then transmitting when the channel is unoccupied for the random time. In this case, it may first listen for a fixed time Ta, and then, when the channel is unoccupied, it may determine whether the channel is unoccupied for a random time N.

In this case, it may be differentially determined how to determine the values of $T_d$ and N according to the priority and importance of traffic, and there may be a total of four different classes. The class may be referred to as a channel access priority class (CAPC).

Also, according to the CAPC, it may have a time length of $T_d=16+m_p*9$ (µs) and have N=random (0, $CW_p$)*9 (µs), and the CW value may start from $CW_{min,p}$ and increase about twice whenever transmission fails and may have a maximum value of $CW_{max,p}$. For example, when LBT is performed by using a CAPC of 3, $T_d$ may have a length of 16+3*9=43 us and N may have a random value selected between 0 and 15 in the case of initial transmission, and for example, when 7 is selected as $CW_p$, N may be 7*9=63 µs and thus the communication device may transmit data when the channel is unoccupied for 106 µs.

TABLE 1

| Channel Access Priority Class (CAPC) (p) | $m_p$ | $CW_{min,p}$ | $CW_{max,p}$ | $T_{m\ cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In the above example (when 7 is selected as $CW_p$ for N), when it is determined that the channel has been occupied by another device (i.e., when a received signal strength indicator (RSSI) is more than or equal to a certain threshold value) in the middle of determining whether the channel is unoccupied (e.g., when $CW_p$ has passed by 3 out of 7 and remains by 4), the UE may wait until the occupancy of the channel ends and then wait for $T_d$ again, and then perform transmission by determining whether the channel is unoccupied for the remaining time of 4. As shown in Table 1, an LBT method with a low CAPC may be used to transmit high-priority traffic.

When the communication device determines that the channel is unoccupied and thus occupies the channel once, the maximum time during which the communication device may occupy the channel may be referred to as $T_{mcot,p}$. That is, the maximum time during which the UE may occupy the channel may be restricted according to the CAPC value. For example, in the case of CAPC=1 having a high priority, the probability of occupying the channel may be high, while the time during which the channel may be occupied may be relatively short. When the CAPC is 3 or 4, a long value (i.e., 10 ms) may be used only when there is no heterogeneous device such as a wireless LAN.

Figure 1D:
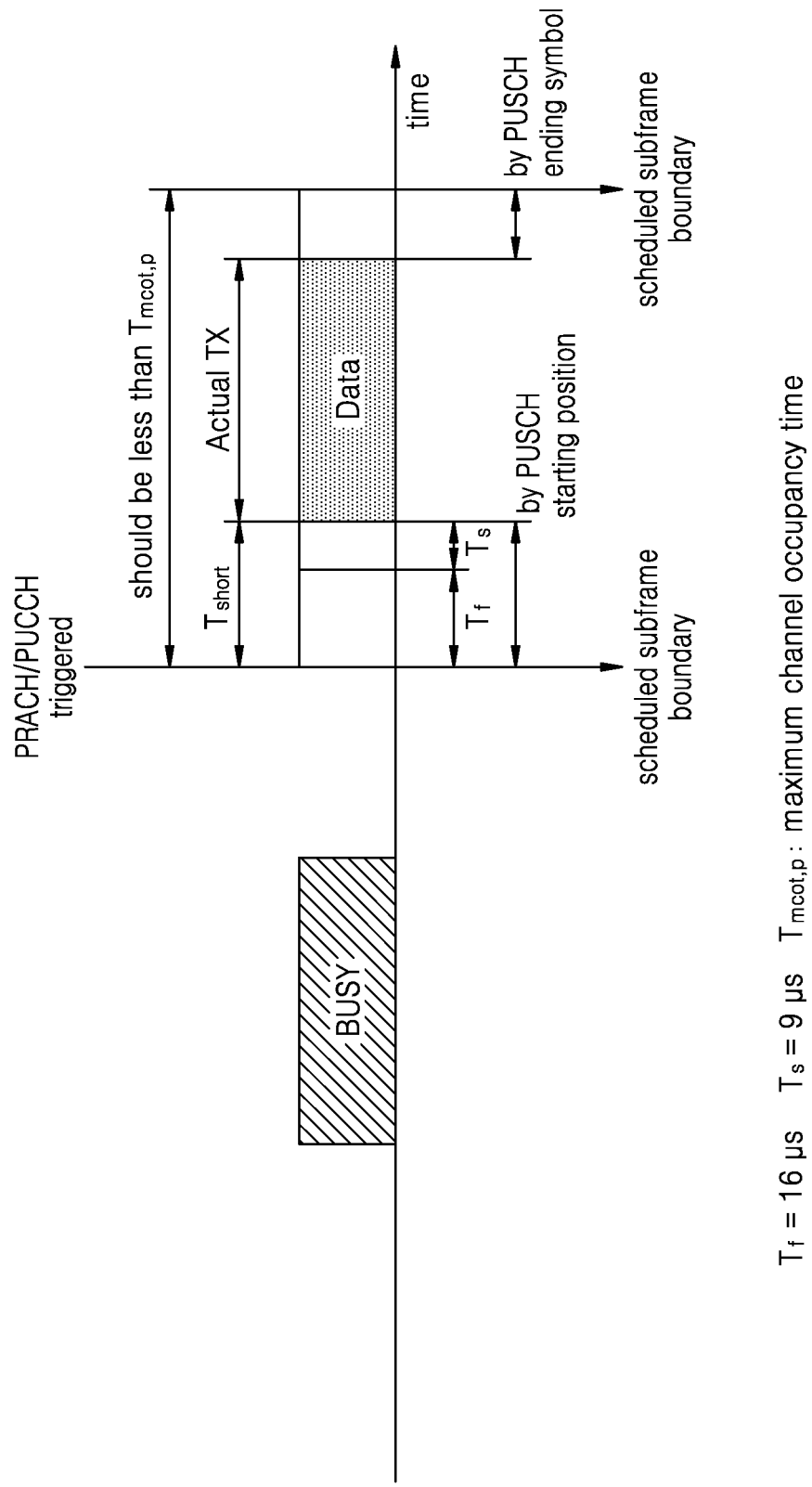
FIG. 1D is a diagram describing LBT Type 2 according to an embodiment of the disclosure.

FIG. 1D is a diagram describing LBT Type 2 according to an embodiment of the disclosure.

Referring to FIG. 1D, LBT Type 2 may be a method of fixing a time for listening to whether other peripheral devices transmit before transmission, and transmitting immediately when the channel is unoccupied for the fixed time. That is, referring to FIG. 1D, when the communication device needs to transmit, it may listen to (sense) the channel for a fixed time of $T_{short}$ (=$T_f+T_s$) and then transmit data immediately when it is determined that the channel is unoccupied. This may be an LBT method that may be used to transmit a signal with a very high priority. Accordingly, a random-access preamble, a PUCCH, or the like may be a signal with a high importance and may be transmitted by using the LBT method of FIG. 1D.

When the base station dynamically allocates a resource for transmitting downlink data and transmits the downlink data, the base station may determine the LBT Type and the CAPC according to the type of data to be transmitted. Also, when the base station dynamically allocates a resource for transmitting uplink data and the UE transmits data to the base station on the resource, the base station may determine the LBT Type and the CAPC to be used by the UE to transmit data and indicate the same to the UE. That is, when the base station transmits uplink resource allocation information to the UE on the PDCCH, the LBT type and the CAPC may be indicated to transmit uplink data. In addition, when the base station determines that the UE does not need to perform LBT, it may indicate not to perform LBT. For example, in the TDD system where downlink and uplink frequencies are equal to each other, when the base station occupies the channel once, and the switching time between the downlink and the uplink is very short, the UE may not need to perform LBT by assuming that the base station continues to occupy the channel. For example, when the base station occupies the channel once by using CAPC=4, it may be assumed that the base station occupies the channel in both the downlink and the uplink for 8 ms or 10 ms, and the UE transmitting data during the corresponding section may not need to perform LBT. In this case, when the base station schedules the uplink to the UE, it may separately indicate that LBT may not need to be performed. Alternatively, when the base station allocates an uplink resource to the UE, when it is determined that the uplink of the UE is to be always allocated in the $T_{mcot,p}$ of the base station, it may be indicated to the UE through a message of the RRC layer (e.g., an RRCReconfiguration message) that LBT may not need to be performed, and both the LBT type and the CAPC may be omitted in the uplink resource allocation in the PDCCH transmitted to the UE.

Also, a method of allocating a periodic resource instead of dynamically allocating a resource for uplink transmission at every time may be used, and such a periodic resource may be referred to as a configured (uplink) grant.

Although not illustrated in the disclosure, in the configured grant used in the licensed band, each periodic resource may be mapped to a particular HARQ process ID and only new data may be transmitted on the periodic resource, and when retransmission is required, the base station may separately and dynamically allocate a resource to the UE to perform retransmission.

The base station may also perform the above operation in the unlicensed band, and when a periodic resource is mapped to a particular HARQ process ID and restricted to transmit only new data as in the licensed band, the corresponding packet may not be transmitted for some time when the UE fails while performing LBT to transmit data on the corresponding resource. In order to solve this, instead of a periodic resource being mapped to a particular HARQ process ID and restricted to transmit only new data as in the licensed band, a HARQ process ID to be transmitted for each periodic resource and whether it is new transmission or retransmission may be separately indicated under the determination of the UE. This may be to allow the base station to determine which data has been received, by together transmitting information about the HARQ process ID, the NDI, and the RVID (hereinafter collectively referred to as UCI) described above, in the PUSCH resource transmitting data, when the UE transmits data on the corresponding resource.

Figure 1E:
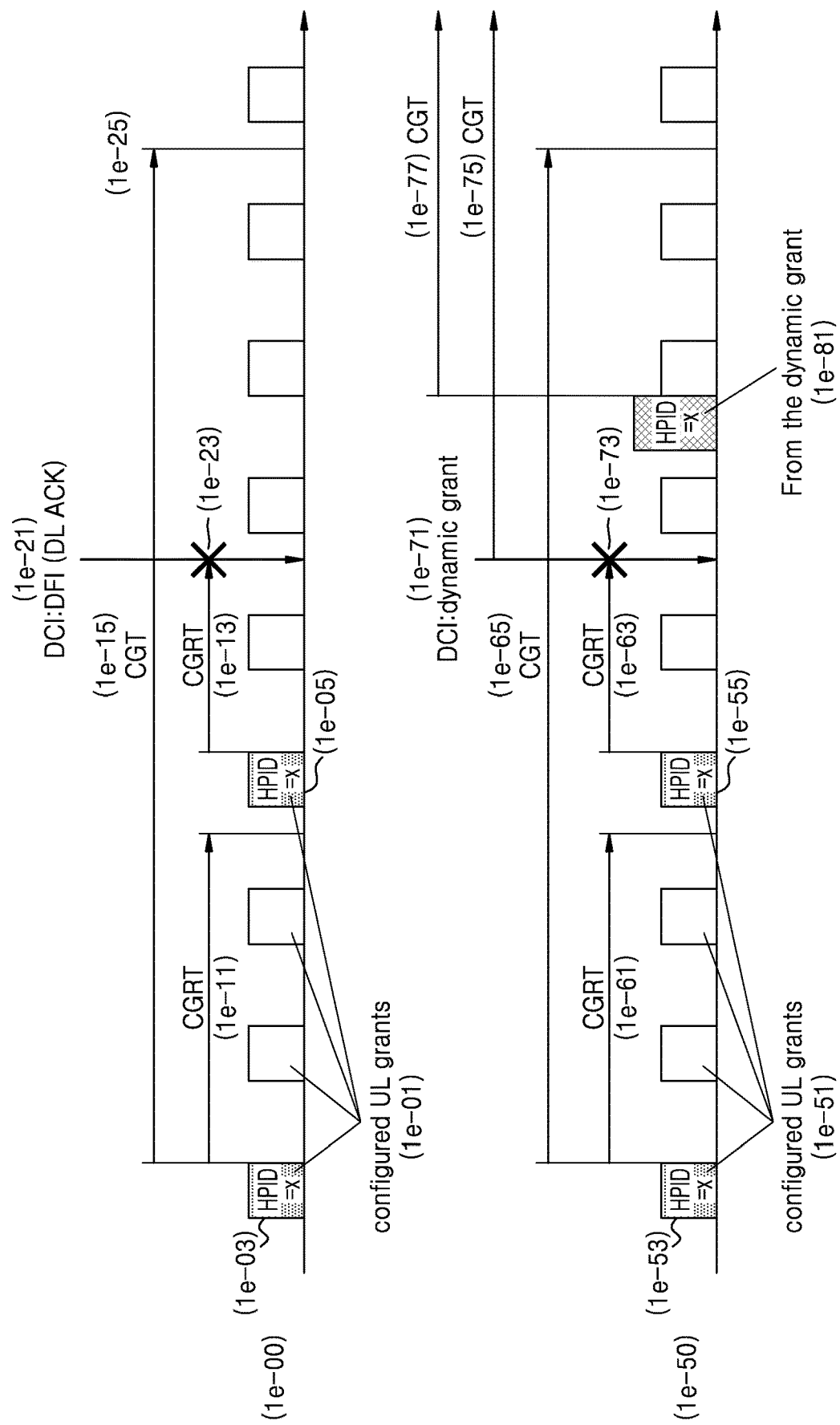
FIG. 1E is a diagram temporally illustrating that a user equipment (UE) transmits data on a configured uplink resource according to an embodiment of the disclosure.

FIG. 1E is a diagram temporally illustrating that a UE transmits uplink data on a configured uplink resource according to an embodiment of the disclosure.

Referring to FIG. 1E, a situation in which the UE is in an RRC connection state (RRC_CONNECTED) by accessing the base station is assumed. Also, a scenario in which the UE is allocated an uplink resource 1e-01 configured to enable periodic uplink transmission, from the base station is assumed. A periodic uplink resource may correspond to a configured grant in the unlicensed band described above (that is, the UE determines data to be transmitted and transmits the same including UCI information); however, the periodic uplink resource itself may not necessarily need to operate in the unlicensed band.

In 1e-00, when uplink data transmission is required, the UE may first perform LBT before transmitting data on the corresponding periodic resource 1e-01 and then transmit data in the uplink when succeeding in the LBT (1e-03). In this case, the UE may allow the base station to decode the corresponding data afterward by notifying which HARQ process ID the corresponding transmission belongs to, whether the corresponding transmission is new transmission (e.g., NDI=0), and which value a transmitted RV value is. Also, when the UE succeeds in the transmission, the UE may drive two types of timers.

A first timer may be referred to as a configured grant timer (CGT) (1e-15), and the first timer may ensure the performance of retransmission by preventing the UE from performing new transmission on the corresponding HARQ process ID while the first timer is running. The expiration of the first timer may mean that the base station has successfully received the corresponding data and new transmission may be performed with the corresponding HARQ process ID.

A second timer may be referred to as a configured grant retransmission timer (CGRT) (1e-11) (1e-13), and the second timer may be to restrict retransmission such that that the base station may determine the reception or not while the second timer is running. The expiration of the second timer may mean that the base station has failed to receive the corresponding data and thus the corresponding data may be retransmitted.

Accordingly, the UE may perform initial transmission (1e-03) and then drive the CGT and the CGRT, and when failing to receive downlink feedback information (DFI) indicating that data has been successfully received from the base station until the CGRT expires, the UE may determine that the corresponding data has not been successfully transmitted, and then perform retransmission of the corresponding data and accordingly, may perform retransmission on a periodic uplink resource (1e-05) and drive the CGRT again (1e-13). Upon successfully receiving the corresponding data, the base station may transmit DFI to the UE to notify the UE that the corresponding data has been successfully received (1e-21), and upon receiving the DFI, the UE may determine that the corresponding data has been successfully transmitted and stop driving the CGRT because the CGRT need no longer be running (1e-23). Thereafter, when the CGT expires (1e-25), the UE may also transmit new data by using the corresponding HARQ process ID.

Likewise, in 1e-50, when uplink data transmission is required, the UE may first perform LBT before transmitting data on a corresponding periodic resource 1e-51 and then transmit data in the uplink when succeeding in the LBT (1e-53). In this case, the UE may allow the base station to decode the corresponding data afterward by notifying which HARQ process ID the corresponding transmission belongs to, whether the corresponding transmission is new transmission (e.g., NDI=0), and which value a transmitted RV value is. Also, as in the above description, when succeeding in the transmission, the UE may drive two types of timers, that is, a CGT (1e-65) and a CGRT (1e-61).

Thereafter, when failing to receive DFI indicating that data has been successfully received from the base station until the CGRT expires, the UE may determine that the corresponding data has not been successfully transmitted and then perform retransmission of the corresponding data, and accordingly, may perform retransmission on a periodic uplink resource (1e-55) and drive the CGRT again (1e-63). Although the base station has not correctly received the corresponding data, the base station may no longer leave it to the UE and may directly and dynamically allocate a resource to perform retransmission. For this purpose, the base station may indicate to the UE retransmission on the corresponding HARQ process ID by using the PDCCH (1e-71). Upon receiving this, the UE may stop the CGRT managed for retransmission in the configured grant (1e-73) and restart the CGT (1e-75). Accordingly, the UE may retransmit the corresponding data according to the uplink resource allocation information received by using the PDCCH (1e-81). Also, the UE may also restart the CGT when actual data has been transmitted as well as when the PDCCH has been received (1e-77). Accordingly, whenever a dynamic resource is scheduled from the base station and whenever transmission is performed, the UE may restart the corresponding CGT and may give all control to the base station.

Figure 1F:
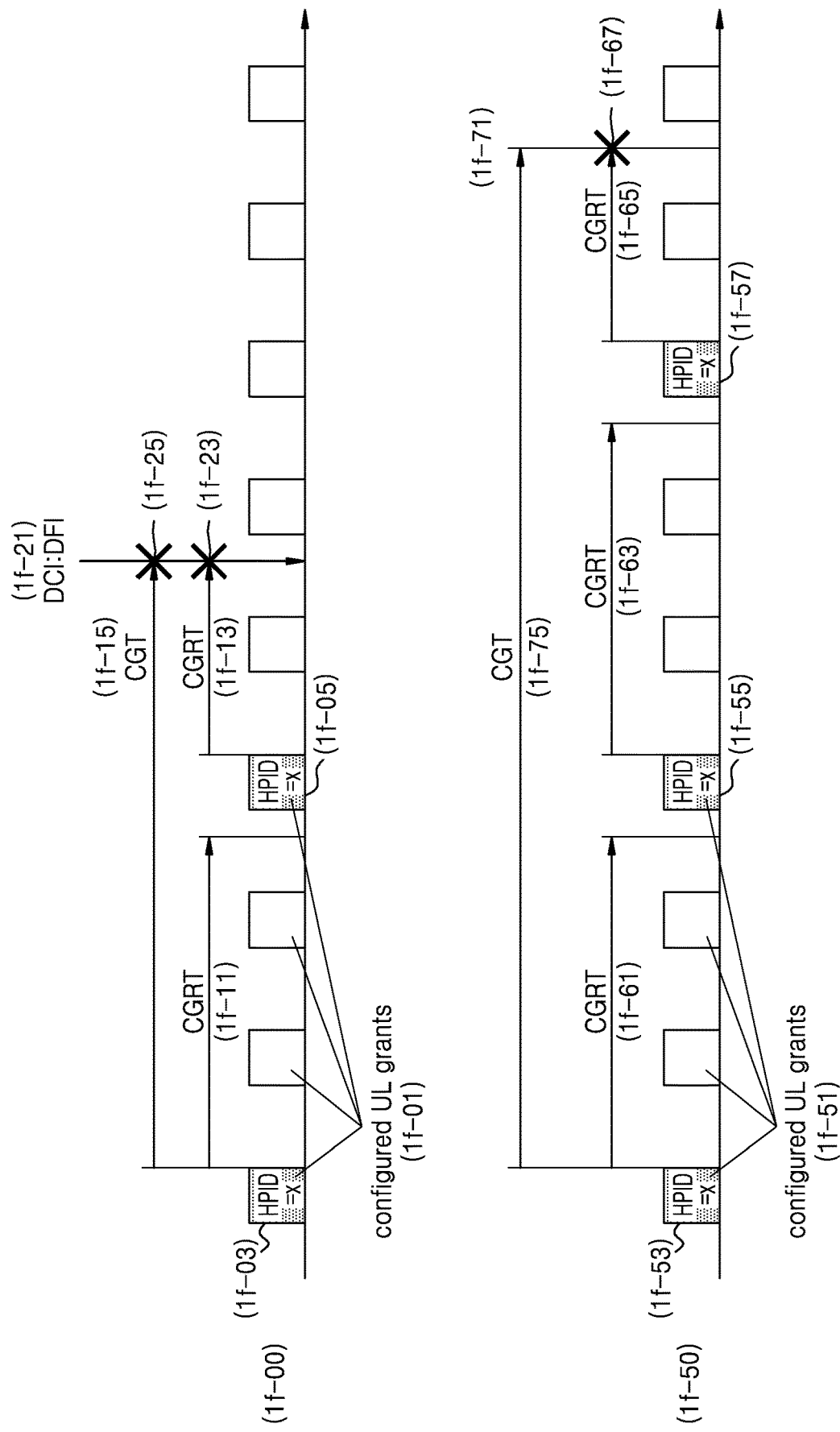
FIG. 1F is another diagram temporally illustrating that a UE transmits data on a configured uplink resource according to an embodiment of the disclosure.

FIG. 1F is another diagram temporally illustrating that a UE transmits data on a configured uplink resource according to an embodiment of the disclosure.

Referring to FIG. 1F, as in FIG. 1E, a situation in which the UE is in an RRC connection state (RRC_CONNECTED) by accessing the base station is assumed. Also, a scenario in which an uplink resource configured to enable periodic uplink transmission is allocated from the base station is assumed. A periodic uplink resource may correspond to a configured grant in the unlicensed band described above (that is, the UE determines data to be transmitted and transmits the same including UCI information); however, the periodic uplink resource itself may not necessarily need to operate in the unlicensed band.

Accordingly, in 1f-00, when uplink data transmission is required, the UE may first perform LBT before transmitting data on a corresponding periodic resource 1f-01 and then transmit data in the uplink when succeeding in LBT (1f-03). In this case, the UE may allow the base station to decode the corresponding data afterward by notifying which HARQ process ID the corresponding transmission belongs to, whether the corresponding transmission is new transmission (e.g., NDI=0), and which value a transmitted RV value is. Also, when succeeding in the transmission, the UE may drive two types of timers, that is, a CGT (1f-15) and a CGRT (1f-11).

Thereafter, when failing to receive DFI indicating that data has been successfully received from the base station until the CGRT expires, the UE may determine that the corresponding data has not been successfully transmitted, and then perform retransmission of the corresponding data and accordingly, may perform retransmission on a periodic uplink resource (1f-05) and drive the CGRT again (1f-13). Upon successfully receiving the corresponding data, the base station may transmit DFI to the UE to notify the UE that the corresponding data has been successfully received (1f-21), and upon receiving the DFI, the UE may determine that the corresponding data has been successfully transmitted and stop driving the CGRT because the CGRT need no longer be running (1f-23). Also, because the corresponding data has been successfully received, the UE may also terminate the CGT such that the corresponding HARQ process ID may be immediately used for new data transmission (1f-25). Accordingly, the UE may immediately transmit new data by using the corresponding HARQ process ID.

In 1f-50, when uplink data transmission is required, the UE may first perform LBT before transmitting data on a corresponding periodic resource 1f-51 and then transmit data in the uplink when succeeding in the LBT (1f-53). In this case, the UE may allow the base station to decode the corresponding data afterward by notifying which HARQ process ID the corresponding transmission belongs to, whether the corresponding transmission is new transmission (e.g., NDI=0), and which value a transmitted RV value is. Also, when succeeding in the transmission, the UE may drive two types of timers, that is, a CGT (1f-75) and a CGRT (1f-61).

Thereafter, when failing to receive DFI indicating that data has been successfully received from the base station until the CGRT expires, the UE may determine that the corresponding data has not been successfully transmitted and then perform retransmission of the corresponding data, and accordingly, may perform retransmission on a periodic uplink resource (1f-55) (1f-57) and drive the CGRT again (1f-63) (1f-65). As illustrated in FIG. 1F, this may be repeated several times and may be repeated until the CGT expires (1f-71). As described above, because the CGT is (re)started when the LBT has succeeded and thus data is actually (re)transmitted, when the CGT has expired, it may be determined that the base station has successfully received data, and accordingly, the CGRT, which has been running, may also be stopped (1f-67). Accordingly, the UE may immediately transmit new data by using the corresponding HARQ process ID.

Figure 1G:
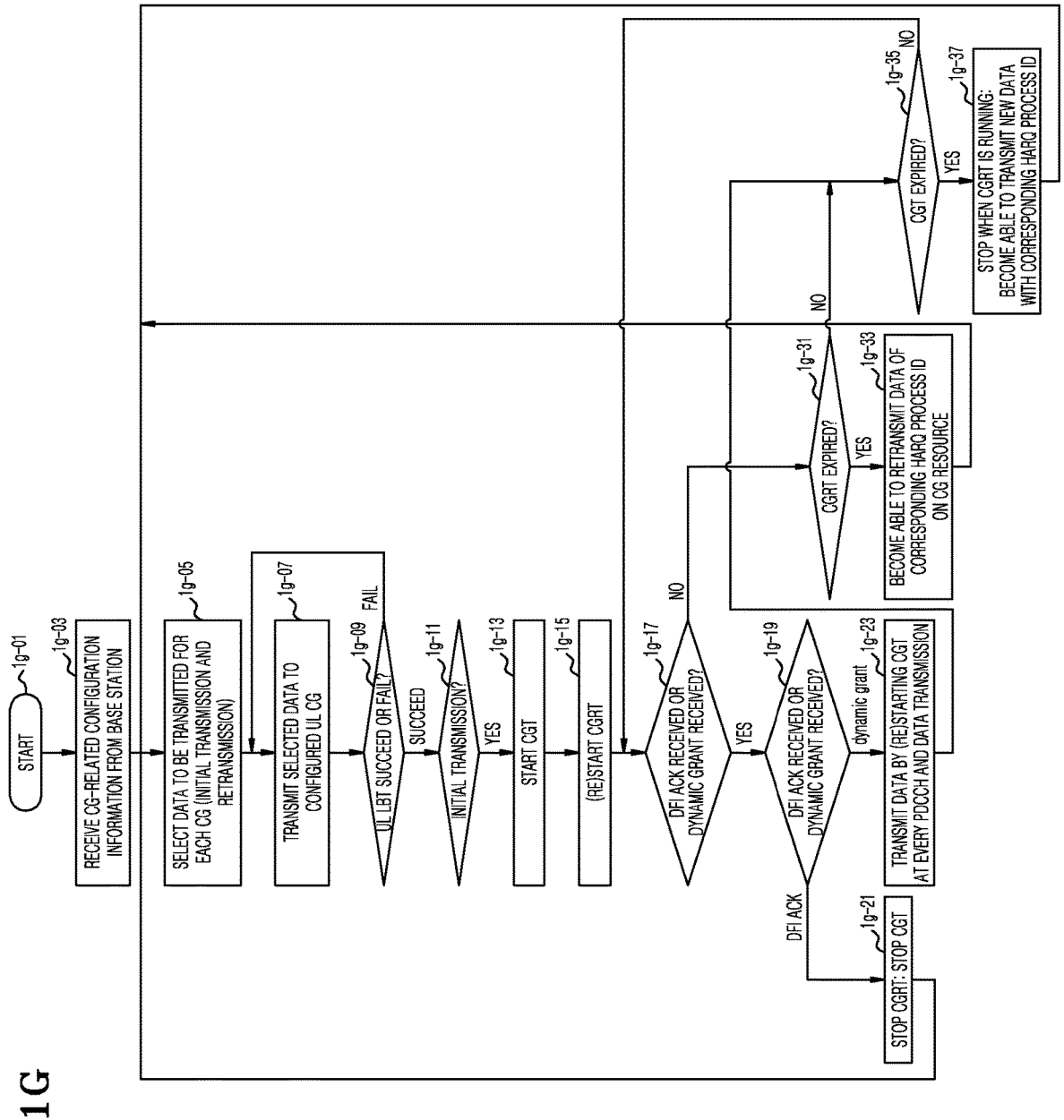
FIG. 1G is a flowchart illustrating an operation sequence when a UE transmits data on a configured uplink resource according to an embodiment of the disclosure.

FIG. 1G is a flowchart illustrating an operation sequence when a UE transmits data on a configured uplink resource according to an embodiment of the disclosure.

Referring to FIG. 1G, a situation in which the UE is in an RRC connection state (RRC_CONNECTED) by accessing the base station is assumed.

The UE may receive a configured uplink resource (configured uplink grant) configured to enable periodic uplink transmission, from the base station at operation 1g-03. A periodic uplink resource may correspond to a configured grant in the unlicensed band described above (that is, the UE determines data to be transmitted and transmits the same including UCI information); however, the periodic uplink resource itself may not necessarily need to operate in the unlicensed band.

Accordingly, the UE may determine how to transmit (RV) data by which HARQ process ID whenever each periodic uplink resource arrives at operation 1g-05, and accordingly, may attempt to transmit the data on the corresponding resource at operation 1g-07. In FIG. 1G, an operation in the unlicensed band is assumed, and accordingly, actual transmission may be determined according to the success or failure of UL LBT. When having failed in the UL LBT at operation 1g-09, the UE may attempt to transmit the corresponding data on the configured grant resource of the next period. When having succeeded in the UL LBT at operation 1g-09, depending on whether the corresponding transmission is initial transmission at operation 1g-11, when the corresponding transmission is initial transmission, the UE may start the CGT at operation 1g-13, and otherwise (that is, when the corresponding transmission is retransmission), the UE may start or restart the CGRT at operation 1g-15.

Thereafter, the UE may receive the DFI from the base station or may be dynamically scheduled for retransmission on the PDCCH at operation 1g-17.

When having received the DFI at operation 1g-19 (that is, when having received ACK information on the corresponding data), the UE may stop the CGRT that has been running and also stop the CGT at operation 1g-21 to transmit new data by the corresponding HARQ process ID at operation 1g-05.

When the UE performs retransmission by dynamically receiving resource allocation from the base station on the PDCCH, the UE may transmit data by (re)starting the CGT whenever receiving the PDCCH and transmitting actual data at operation 1g-23. From this time, the UE may pass all control of resource allocation to the base station, and accordingly, when the CGT expires at operation 1g-35, the UE may determine that the corresponding data has been successfully transmitted and transmit new data by the corresponding HARQ process ID at operation 1g-05. In this case, because the CGRT is not running, it may be unnecessary to stop the CGRT separately.

When the UE fails to receive the DFI from the base station or when the CGRT expires in the state where the retransmission is not dynamically scheduled on the PDCCH at operation 1g-31, the UE may consider that the base station has failed to receive the corresponding data and thus may retransmit the corresponding data on a periodic resource at operation 1g-33 and accordingly may select the corresponding data to be transmitted on the periodic resource at operation 1g-05.

When the CGT expires at operation 1g-35, it is determined that the corresponding data has been successfully transmitted, and when the CGRT is running, the CGRT may be stopped at operation 1g-37 and the UE may immediately transmit new data by the corresponding HARQ process ID at operation 1g-05.

Figure 1H:
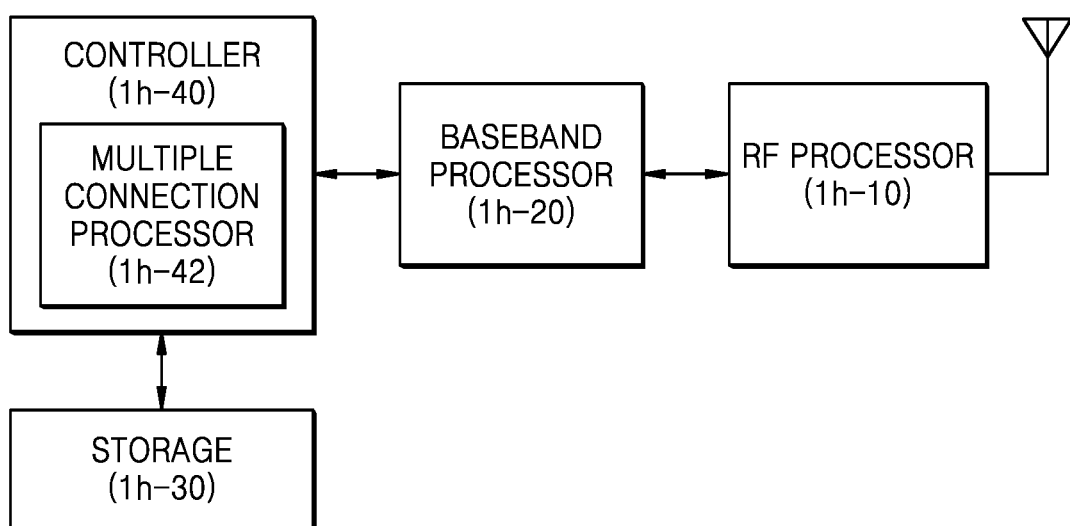
FIG. 1H is a block diagram of a UE in a wireless communication system according to an embodiment of the disclosure.

FIG. 1H is a block diagram of a UE in a wireless communication system according to an embodiment of the disclosure.

Referring to FIG. 1H, the UE may include a radio frequency (RF) processor 1h-10, a baseband processor 1h-20, storage 1h-30, and at least one processor or controller 1h-40.

The RF processor 1h-10 may perform functions for transmitting or receiving signals by using wireless channels, such as band conversion and amplification of signals. That is, the RF processor 1h-10 may up-convert a baseband signal provided from the baseband processor 1h-20 into an RF band signal and transmit the same through an antenna, and may down-convert an RF band signal received through the antenna into a baseband signal. For example, the RF processor 1h-10 may include a transmission filter, a reception filter, an amplifier, a mixer, an oscillator, a digital-to-analog converter (DAC), and an analog-to-digital converter (ADC). Although only one antenna is illustrated in FIG. 1H, the UE may include a plurality of antennas. Also, the RF processor 1h-10 may include a plurality of RF chains. In addition, the RF processor 1h-10 may perform beamforming. For beamforming, the RF processor 1h-10 may adjust the phase and magnitude of each of the signals transmitted or received through a plurality of antennas or antenna elements.

The baseband processor 1h-20 may perform a conversion function between a baseband signal and a bitstream according to the physical layer standard of the system. For example, during data transmission, the baseband processor 1h-20 may generate complex symbols by encoding and modulating a transmission bitstream. Also, during data reception, the baseband processor 1h-20 may restore a reception bitstream by demodulating and decoding the baseband signal provided from the RF processor 1h-10. For example, according to an OFDM scheme, during data transmission, the baseband processor 1h-20 may generate complex symbols by encoding and modulating a transmission bitstream, map the complex symbols to subcarriers, and then configure OFDM symbols through an inverse fast Fourier transform (IFFT) operation and cyclic prefix (CP) insertion. Also, during data reception, the baseband processor 1h-20 may divide a baseband signal provided from the RF processor 1h-10 into OFDM symbol units, restore signals mapped to the subcarriers through a fast Fourier transform (FFT) operation, and then restore a reception bitstream through demodulation and decoding.

The baseband processor 1h-20 and the RF processor 1h-10 may transmit and receive signals as described above. Accordingly, the baseband processor 1h-20 and the RF processor 1h-10 may be referred to as a transmitter, a receiver, a transceiver, or a communicator. In addition, at least one of the baseband processor 1h-20 or the RF processor 1h-10 may include a plurality of communication modules to support a plurality of different radio access technologies. Also, at least one of the baseband processor 1h-20 or the RF processor 1h-10 may include different communication modules to process signals of different frequency bands. For example, the different wireless access technologies may include wireless LAN (e.g., IEEE 802.11) and cellular network (e.g., LTE). Also, the different frequency bands may include a super high frequency (SHF) (e.g., 2.5 GHz or 5 GHZ) band and a millimeter wave (e.g., 60 GHz) band.

The storage 1h-30 may store data such as a basic program, an application program, or configuration information, for operation of the UE. Particularly, the storage 1h-30 may store information related to a wireless LAN node performing wireless communication by using the wireless LAN access technology. Also, the storage 1h-30 may provide the stored data at the request of the controller 1h-40.

The controller 1h-40 may control overall operations of the UE. For example, the controller 1h-40 may transmit or receive signals through the baseband processor 1h-20 and the RF processor 1h-10. Also, the controller 1h-40 may write/read data into/from the storage 1h-30. For this purpose, the controller 1h-40 may include at least one processor. For example, the controller 1h-40 may include a communication processor (CP) for performing control for communication and an application processor (AP) for controlling a higher layer such as an application program. According to an embodiment of the disclosure, the controller 1h-40 may include a multiple connection processor 1h-42 performing a process for operating in a multiple connection mode. For example, the controller 1h-40 may control the UE to perform the procedure illustrated in the operation of the UE illustrated in FIG. 1E.

According to an embodiment of the disclosure, the controller 1h-40 may control transmission by driving the CGT and the CGRT in order to transmit data in the uplink configured by the above methods.

Figure 2A:
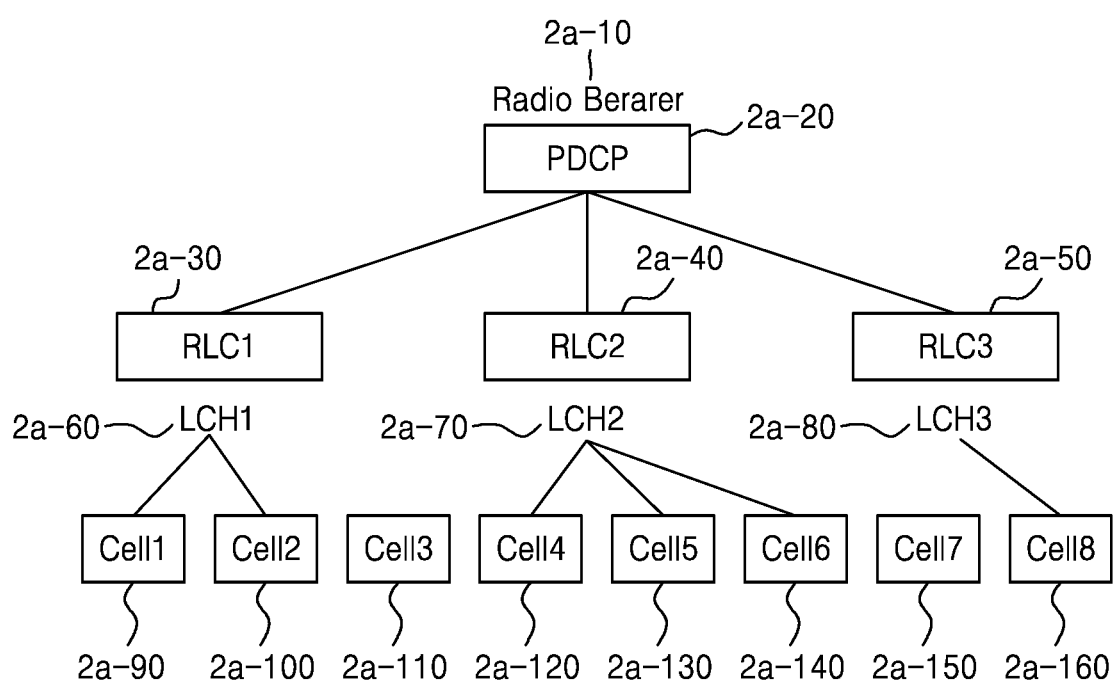
FIG. 2A illustrates a radio bearer performing packet duplication transmission in a wireless communication system according to an embodiment of the disclosure.

FIG. 2A illustrates a radio bearer performing packet duplication transmission in a wireless communication system according to an embodiment of the disclosure.

Referring to FIG. 2A, a radio bearer (2a-10) in which packet duplication transmission may be configured may include one packet data convergence protocol (PDCP) entity 2a-20 and two or more radio link control (RLC) entities 2a-30, 2a-40, and 2a-50. When packet duplication transmission is activated, the radio bearer may implement duplication transmission of the same packet by duplicating packets in the PDCP entity 2a-20 and transmitting each of the duplicated packets to a plurality of RLC entities 2a-30, 2a-40, and 2a-50 used in the packet duplication transmission. The RLC entities 2a-30, 2a-40, and 2a-50 may be respectively transmitted by using logical channels 2a-60, 2a-70, and 2a-80 to a medium access control (MAC) layer to perform transmission. In this case, because the RLC entities 2a-30, 2a-40, and 2a-50 may have one-to-one correspondence with the logical channels 2a-60, 2a-70, and 2a-80, referring to a particular logical channel may mean an RLC entity corresponding to the logical channel. The logical channels 2a-60, 2a-70, and 2a-80 may receive a list of available cells from the base station. In FIG. 2A, it is assumed that the logical channel 1 (2a-60) may use a cell 1 (2a-90) and a cell 2 (2a-100), the logical channel 2 (2a-70) may use a cell 4 (2a-120), a cell 5 (2a-130), and a cell 6 (2a-140), and the logical channel 3 (2a-80) may use a cell 8 (2a-160). In this example, cell 3 (2a-110) and cell 7 (2a-150) are present, but unused.

A list of cells usable by each logical channel may be transmitted by being included in the logical channel configuration in an RRC configuration message that is transmitted from the base station to the UE. As described above, because the RLC entity and the logical channel may have one-to-one correspondence with each other, a list of cells usable by the logical channel may correspond to a list of cells usable by the RLC entity. The cells described in FIG. 2A may be cells configured in the same cell group or in some cases, may be cells configured in two or more cell groups. Also, among the RLC entities configured in the radio bearer, an RLC entity (2a-30, 2a-40, or 2a-50) and a primary RLC entity may be included. In this case, the primary RLC may be used to transmit a PDCP control protocol data unit (PDU) or may be used to preferentially transmit a packet when packet duplication transmission is deactivated. Also, a secondary RLC entity may be configured in the radio bearer. In this case, the secondary RLC entity may be used for a split bearer operation when packet duplication transmission is deactivated among the RLC entities configured in a different cell group than the primary RLC entity.

Figure 2B:
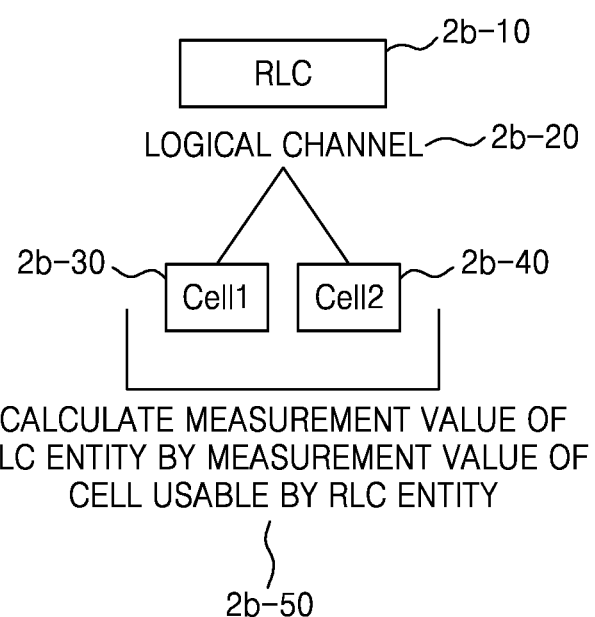
FIG. 2B illustrates a method of calculating a measurement value of a radio link control (RLC) entity according to an embodiment of the disclosure.

FIG. 2B illustrates a method of calculating a measurement value of an RLC entity according to an embodiment of the disclosure.

Referring to FIG. 2B, the activation and deactivation of packet duplication transmission may be configured by the base station. However, the activation and deactivation of packet duplication transmission by the base station may take a long time until the base station recognizes the state change of the UE and issues an activation or deactivation command to the UE. In addition, an additional delay time may occur when the UE does not accurately receive a packet duplication activation or deactivate command. In order to reduce this inefficiency, the UE may spontaneously perform packet duplication transmission according to a configured or preconfigured rule. This rule may be due to the result of measuring a cell usable by the radio bearer performing packet duplication transmission. FIG. 2B illustrates a method of defining a measurement value of an RLC entity (or a corresponding logical channel) used to perform spontaneous packet duplication transmission of the UE. In FIG. 2B, it is assumed that the cells usable by the logical channel are a cell 1 (2b-30) and a cell 2 (2b-40). Because the UE measures the channel quality of both the cell 1 (2b-30) and the cell 2 (2b-40), these values may be used to derive a measurement value of the channel quality of an RLC entity 2b-10 (or a corresponding logical channel 2b-20) (2b-50). In this case, the measured value of the channel quality of the RLC entity 2b-10 (or the corresponding logical channel 2b-20) may be one of the average value, the minimum value, the maximum value, and the median value of the measurement values of the cells usable by the RLC entity 2b-10. In this case, the usable cells may be configured cells or activated cells among the configured cells. The measurement value of the channel quality mentioned in FIG. 2B may include one of a reference signal received power (RSRP), a reference signal received quality (RSRQ), a signal-to-interference and noise ratio (SINR), and a channel quality indicator (CQI). Also, the measurement value may be a value to which one or more of L1 filtering or L3 filtering are applied.

Figure 2C:
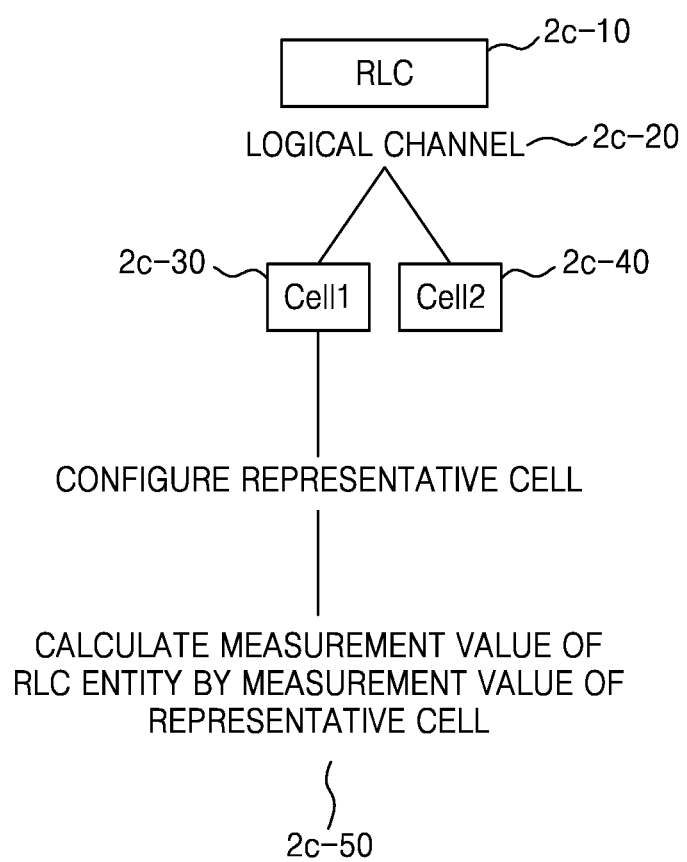
FIG. 2C illustrates another method of calculating a measurement value of an RLC entity according to an embodiment of the disclosure.

FIG. 2C illustrates another method of calculating a measurement value of an RLC entity according to an embodiment of the disclosure.

Referring to FIG. 2C, the activation and deactivation of packet duplication transmission may be configured by the base station. However, the activation and deactivation of packet duplication transmission by the base station may take a long time until the base station recognizes the state change of the UE and issues an activation or deactivation command. In addition, an additional delay time may occur when the UE does not accurately receive a packet duplication activation or deactivate command. In order to reduce this inefficiency, the UE may spontaneously perform packet duplication transmission according to a configured or preconfigured rule. This rule may be due to the result of measuring a cell usable by the radio bearer performing packet duplication transmission. FIG. 2C illustrates a method of defining a measurement value of an RLC entity (or a corresponding logical channel) used to perform spontaneous packet duplication transmission of the UE. In FIG. 2C, it is assumed that the cells usable by the logical channel are a cell 1 (2c-30) and a cell 2 (2c-40). In this case, among the cells usable in an RLC entity 2c-10, the channel quality of a configured or preconfigured representative cell may be used as the channel quality of the RLC entity 2c-10 (or the corresponding logical channel 2c-20) (2c-50). In FIG. 2C, it is assumed that cell 1 (2c-30) is configured as a representative cell. Which cell will be the representative cell may be included in an RRC configuration message of the base station or may be configured according to a predetermined rule. For example, the cell having the lowest (or highest) cell index value among usable cells may be the representative cell. In this case, the usable cells may be configured cells or activated cells among the configured cells. The measurement value of the channel quality mentioned in FIG. 2C may include one of a RSRP, a RSRQ, a SINR, and a CQI. Also, the measurement value may be a value to which one or more of L1 filtering or L3 filtering are applied.

Figure 2D:
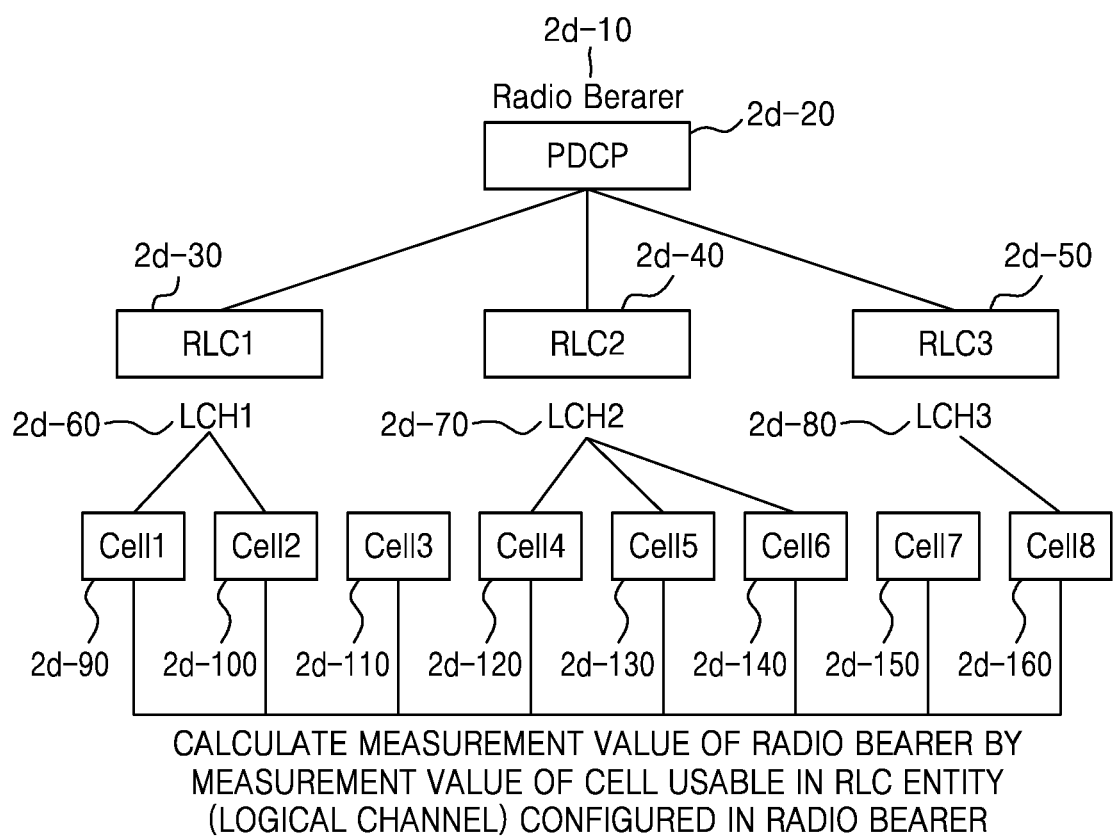
FIG. 2D illustrates a method of calculating a measurement value of a radio bearer according to an embodiment of the disclosure.

FIG. 2D illustrates a method of calculating a measurement value of a radio bearer according to an embodiment of the disclosure.

Referring to FIG. 2D, the activation and deactivation of packet duplication transmission may be configured by the base station. However, the activation and deactivation of packet duplication transmission by the base station may take a long time until the base station recognizes the state change of the UE and issues an activation or deactivation command. In addition, an additional delay time may occur when the UE does not accurately receive a packet duplication activation or deactivate command. In order to reduce this inefficiency, the UE may spontaneously perform packet duplication transmission according to a configured or preconfigured rule. This rule may be due to the result of measuring a cell usable by the radio bearer performing packet duplication transmission. FIG. 2D illustrates a method of defining a measurement value of a radio bearer used to perform spontaneous packet duplication transmission of the UE. In FIG. 2D, it is assumed that a radio bearer 2d-10 includes a total of three RLC entities such as an RLC 1 (2d-30), an RLC 2 (2d-40), and an RLC 3 (2d-50), and a PDCP 2d-20. Also, the RLC 1 may correspond to a logical channel 1 (2d-60), the RLC 2 may correspond to a logical channel 2 (2d-70), and the RLC 3 may correspond to a logical channel 3 (2d-80). It is assumed that the logical channel 1 (2d-60) may use a cell 1 (2d-90) and a cell 2 (2d-100), the logical channel 2 (2d-70) may use a cell 4 (2d-120), a cell 5 (2d-130), and a cell 6 (2d-140), and the logical channel 3 (2d-80) may use a cell 8 (2d-160). In this example, cell 3 (2d-110) and cell 7 (2d-150) are present, but unused.

A list of cells usable by each logical channel may be transmitted by being included in the logical channel configuration in an RRC configuration message that is transmitted from the base station to the UE. As described above, because the RLC entity and the logical channel may have one-to-one correspondence with each other, a list of cells usable by the logical channel may correspond to a list of cells usable by the RLC entity. Because the UE measures the channel quality of each cell, a measurement value of the channel quality of the radio bearer may be derived by using the measurement values of the cell usable in the RLC entity (the logical channel) configured in the radio bearer (2d-200). In this case, the measurement value of the channel quality of the radio bearer may be one of the average value, the minimum value, the maximum value, and the median value of the measurement values of the corresponding cells. In this case, the usable cells may be configured cells or activated cells among the configured cells. The measurement value of the channel quality mentioned in FIG. 2D may include one of a RSRP, a RSRQ, a SINR, and a CQI. Also, the measurement value may be a value to which one or more of L1 filtering or L3 filtering are applied.

Figure 2E:
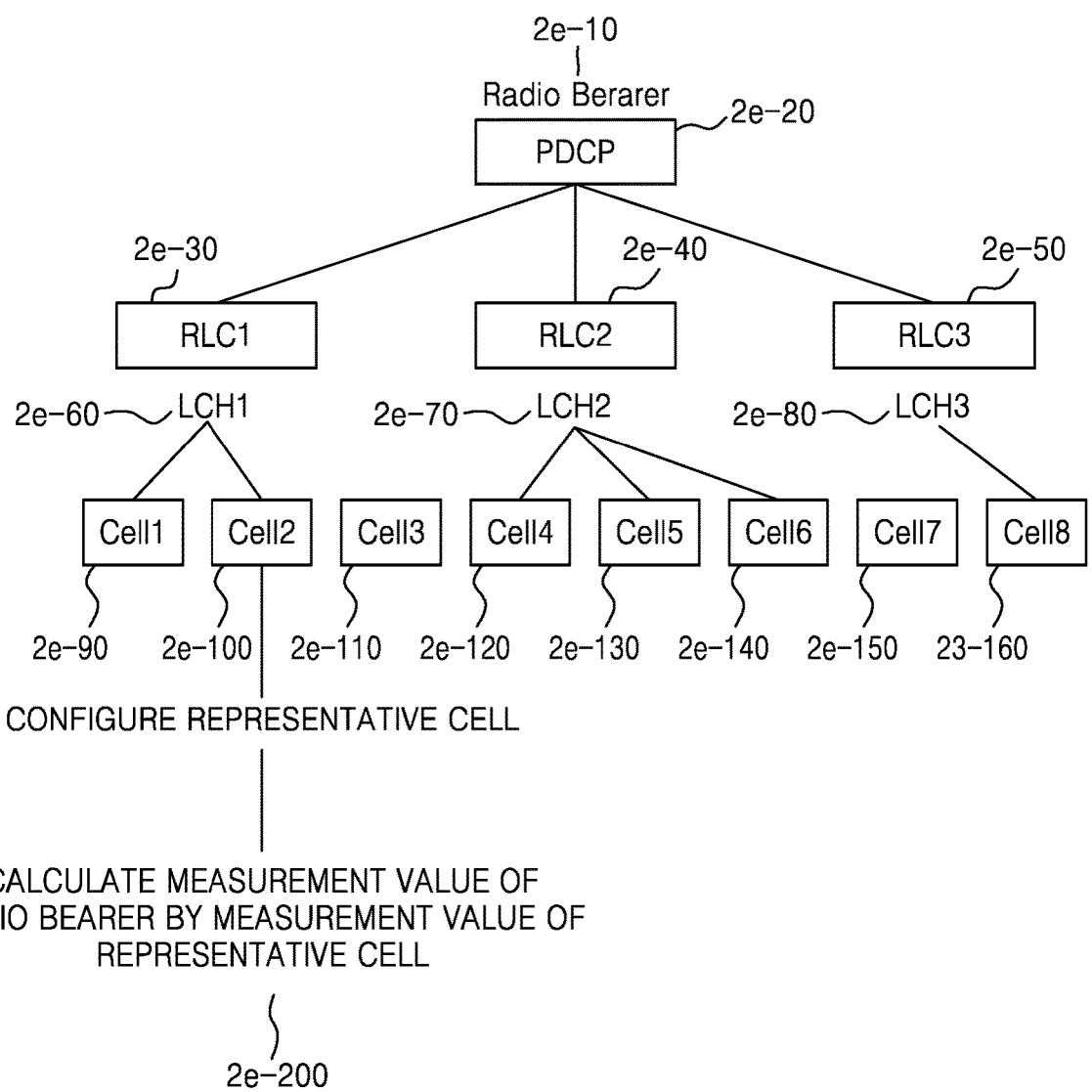
FIG. 2E illustrates another method of calculating a measurement value of a radio bearer according to an embodiment of the disclosure.

FIG. 2E illustrates another method of calculating a measurement value of a radio bearer according to an embodiment of the disclosure.

Referring to FIG. 2E, the activation and deactivation of packet duplication transmission may be configured by the base station. However, the activation and deactivation of packet duplication transmission by the base station may take a long time until the base station recognizes the state change of the UE and issues an activation or deactivation command. In addition, an additional delay time may occur when the UE does not accurately receive a packet duplication activation or deactivate command. In order to reduce this inefficiency, the UE may spontaneously perform packet duplication transmission according to a configured or preconfigured rule. This rule may be due to the result of measuring a cell usable by the radio bearer performing packet duplication transmission. FIG. 2E illustrates a method of defining a measurement value of a radio bearer used to perform spontaneous packet duplication transmission of the UE. In FIG. 2E, it is assumed that a radio bearer 2e-10 includes a total of three RLC entities such as an RLC 1 (2e-30), an RLC 2 (2e-40), and an RLC 3 (2e-50), and a PDCP 2e-20. Also, the RLC 1 (2e-30) may correspond to a logical channel 1 (2e-60), the RLC 2 (2e-40) may correspond to a logical channel 2 (2e-70), and the RLC 3 (2e-50) may correspond to a logical channel 3 (2e-80). It is assumed that the logical channel 1 (2e-60) may use a cell 1 (2e-90) and a cell 2 (2e-100), the logical channel 2 (2e-70) may use a cell 4 (2e-120), a cell 5 (2e-130), and a cell 6 (2e-140), and the logical channel 3 (2e-80) may use a cell 8 (2e-160). In this example, cell 3 (2e-110) and cell 7 (2e-150) are present, but unused.

A list of cells usable by each logical channel may be transmitted by being included in the logical channel configuration in an RRC configuration message that is transmitted from the base station to the UE. As described above, because the RLC entity and the logical channel may have one-to-one correspondence with each other, a list of cells usable by the logical channel may correspond to a list of cells usable by the RLC entity. Because the UE measures the channel quality of each cell, a measurement value of the channel quality of the radio bearer may be derived by using the measurement value of a representative cell among the cells usable in the RLC entity (the logical channel) configured in the radio bearer (2e-200). In FIG. 2E, it is assumed that cell 2 (2e-100) is configured as the representative cell. Which cell will be the representative cell may be included in an RRC configuration message of the base station or may be configured according to a predetermined rule. For example, the cell having the lowest (or highest) cell index value among usable cells may be the representative cell. In this case, the usable cells may be configured or preconfigured cells, or activated cells among the configured of preconfigured cells. The measurement value of the channel quality mentioned in FIG. 2E may include one of a RSRP, a RSRQ, a SINR, and a CQI. Also, the measurement value may be a value to which one or more of L1 filtering or L3 filtering are applied.

Figure 2F:
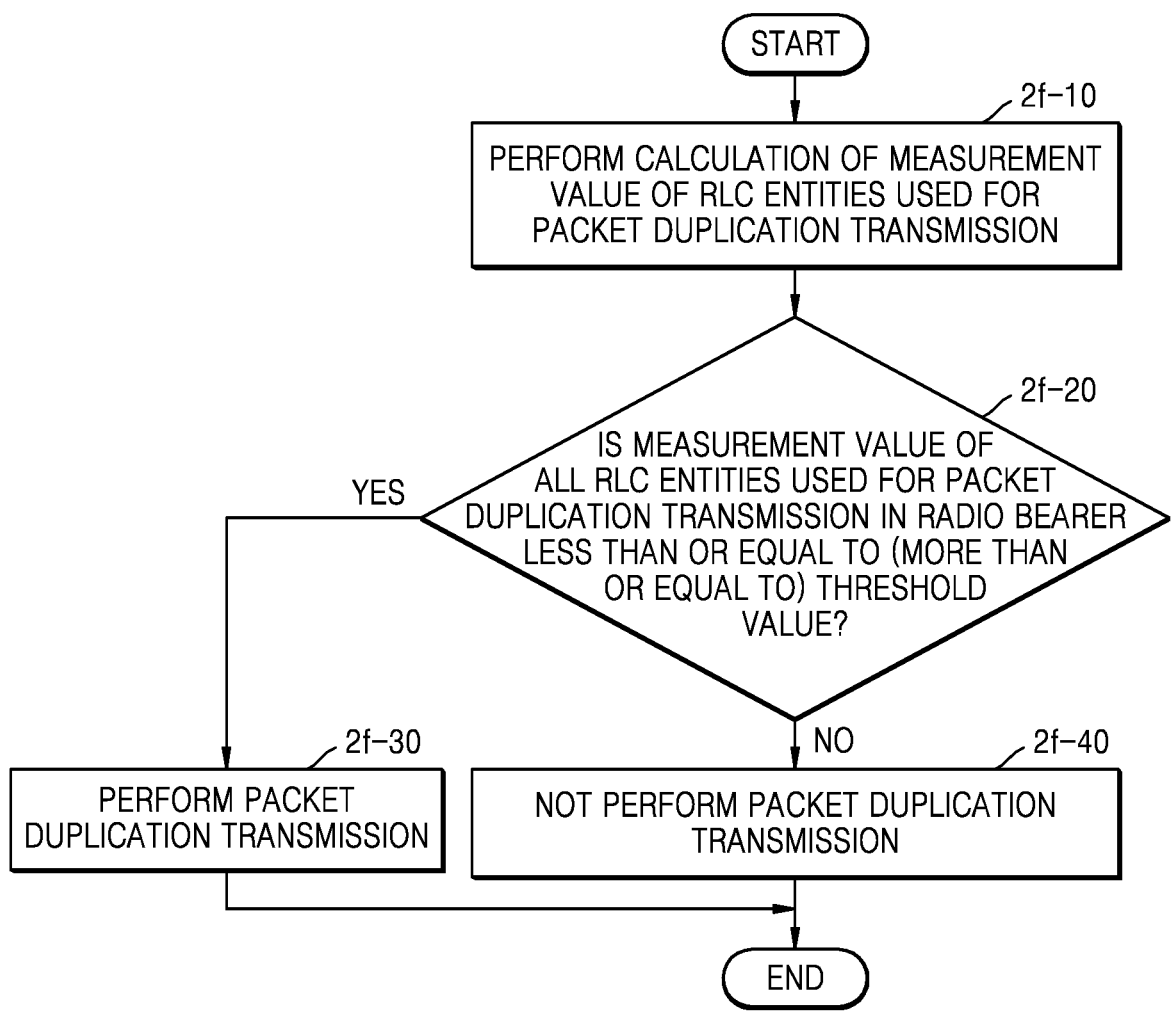
FIG. 2F is a flowchart illustrating a method of a UE performing spontaneous packet duplication transmission according to an embodiment of the disclosure.

FIG. 2F is a flowchart illustrating a method of a UE performing spontaneous packet duplication transmission according to an embodiment of the disclosure.

Referring to FIG. 2F, the UE may determine whether to perform packet duplication transmission by itself by using the measured value of the RLC entity described in FIG. 2B or 2C. When packet duplication transmission is configured in a certain radio bearer, the UE may perform calculation of the measurement values of RLC entities used for packet duplication transmission at operation 2f-10. The calculation of the measurement values may be the method described in FIG. 2B or 2C. In this case, it may be confirmed whether the measurement value of all RLC entities used for packet transmission in the radio bearer is less than, more than, or equal to a configured or preconfigured threshold value at operation 2f-20. However, according to an embodiment of the disclosure, it may be determined whether the measurement value is less than, more than, or equal to a threshold value for some RLC entities among all of the configured RLC entities. When the measurement value of all RLC entities used for packet transmission in the radio bearer is less than, more than, or equal to a configured or preconfigured threshold value, the UE may perform packet duplication transmission at operation 2f-30. When the measured value of the RLC entity does not satisfy the condition of operation 2f-20, packet duplication transmission may not be performed at operation 2f-40. That is, the UE may perform packet duplication transmission only when packet duplication transmission is required. Here, when the UE does not perform packet duplication transmission, the packet may be transmitted only to a preconfigured primary RLC entity or the packet may be transmitted to one RLC entity among the configured RLC entities. When the packet duplication transmission is deactivated, when a split bearer operation should be performed, threshold-based data transmission may be performed for the operation of a split bearer by using one master cell group (MCG) RLC and one secondary cell group (SCG) RLC.

Figure 2G:
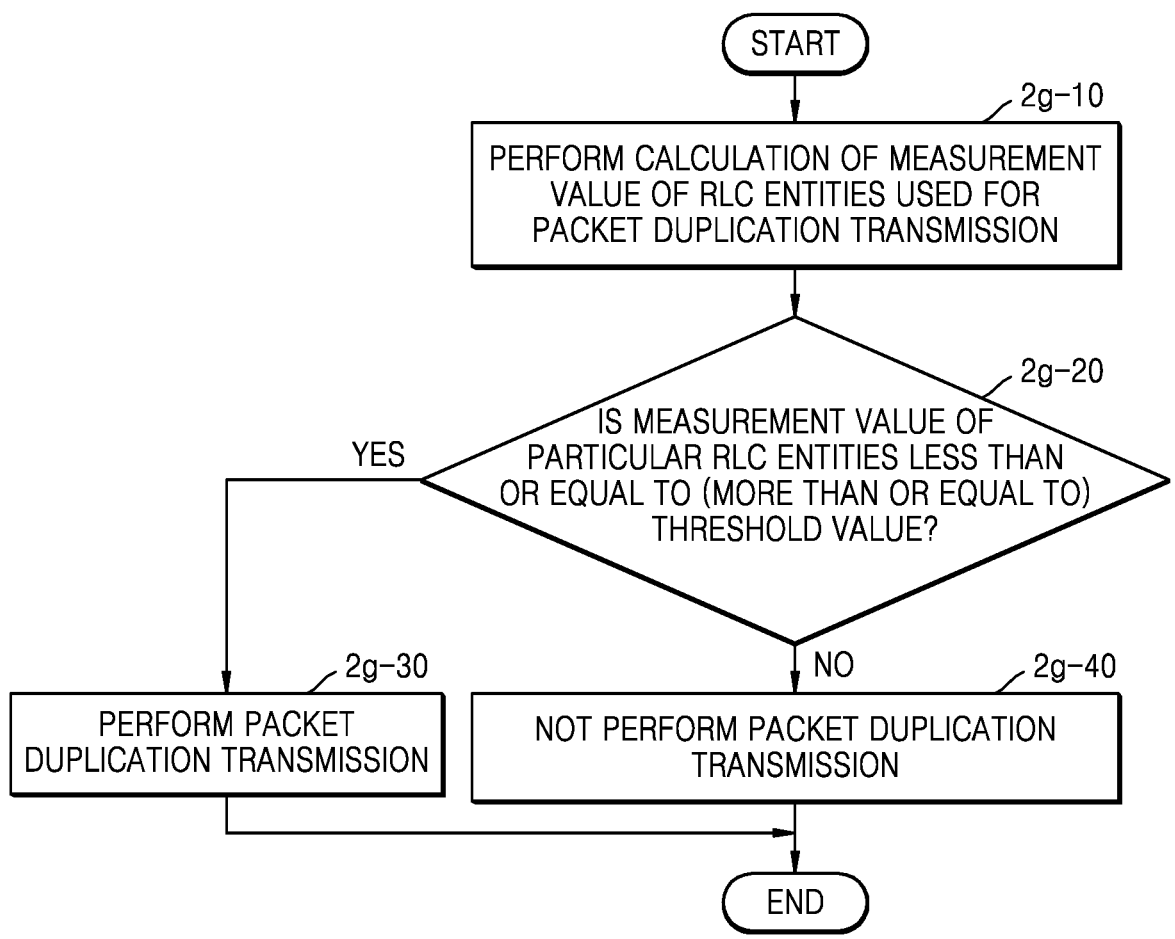
FIG. 2G is another flowchart illustrating a method of a UE performing spontaneous packet duplication transmission according to an embodiment of the disclosure.

FIG. 2G is another flowchart illustrating a method of a UE performing spontaneous packet duplication transmission according to an embodiment of the disclosure.

Referring to FIG. 2G, the UE may determine whether to perform packet duplication transmission by itself by using the measured value of the RLC entity described in FIG. 2B or 2C. When packet duplication transmission is configured in a certain radio bearer, the UE may perform calculation of the measurement values of RLC entities used for packet duplication transmission at operation 2g-10. The calculation of the measurement values may be performed by using the method described in FIG. 2B or 2C. Also, the UE may determine whether the measurement value of a particular RLC entity of the radio bearer is less than, more than, or equal to a configured or preconfigured threshold value at operation 2g-20. In this case, the particular RLC entity may be one of a primary RLC entity or a secondary RLC entity. Also, when the measurement value of a particular RLC entity of the radio bearer is less than, more than, or equal to a configured or preconfigured threshold value, the UE may perform packet duplication transmission at operation 2g-30. When the measurement value of particular RLC entities does not satisfy the condition of operation 2g-20, the UE may not perform packet duplication transmission at operation 2g-40. That is, the UE may perform packet duplication transmission only when packet duplication transmission is required. Here, when the UE does not perform packet duplication transmission, the packet may be transmitted only to a preconfigured primary RLC entity, the packet may be transmitted only to a particular RLC entity of the measurement value for determining packet duplication transmission specified in operation 2g-20, or the packet may be transmitted to any one of the configured RLC entities. When the packet duplication transmission is deactivated, when a split bearer operation should be performed, threshold-based data transmission may be performed for the operation of a split bearer by using one MCG RLC and one SCG RLC.

Figure 2H:
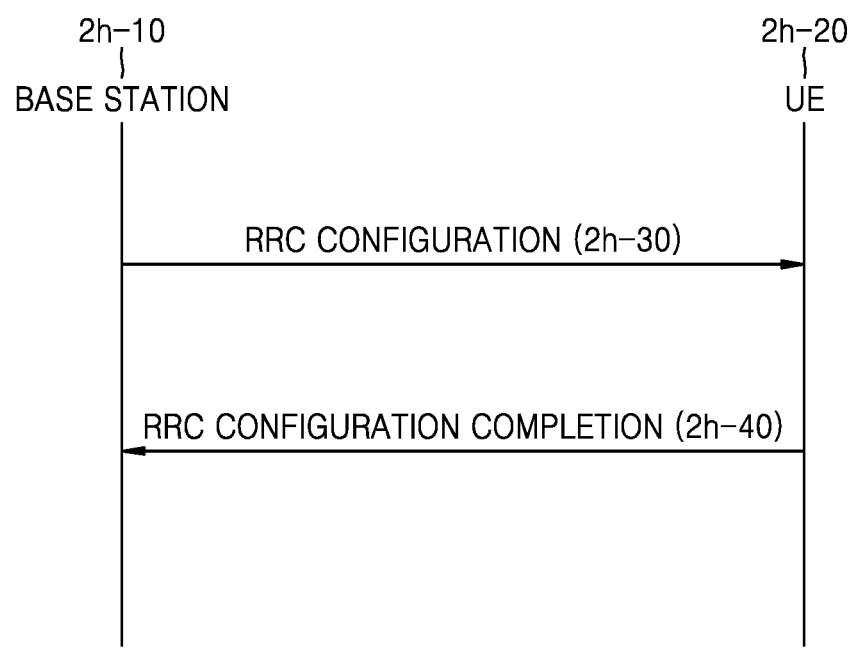
FIG. 2H illustrates a method of configuring spontaneous packet duplication transmission of a UE according to an embodiment of the disclosure.

FIG. 2H illustrates a method of configuring spontaneous packet duplication transmission of a UE according to an embodiment of the disclosure.

Referring to FIG. 2H, a base station 2h-10 may configure a radio bearer for performing packet duplication transmission to a UE 2h-20 through an RRC configuration (2h-30) or a reconfiguration message (not illustrated). In this case, the base station 2h-10 may configure whether to perform spontaneous packet duplication of the UE 2h-20 for each radio bearer. In addition, the base station 2h-10 may also notify whether spontaneous packet duplication transmission will be performed under a certain condition. The condition in which packet duplication transmission is performed may be determined based on the above measurement value of the RLC entity or the measurement value of the radio bearer. After receiving an RRC configuration or reconfiguration message (not illustrated) from the base station 2h-10, the UE 2h-20 may transmit an RRC configuration or reconfiguration completion message to the base station 2h-10 (2h-40).

Figure 2I:
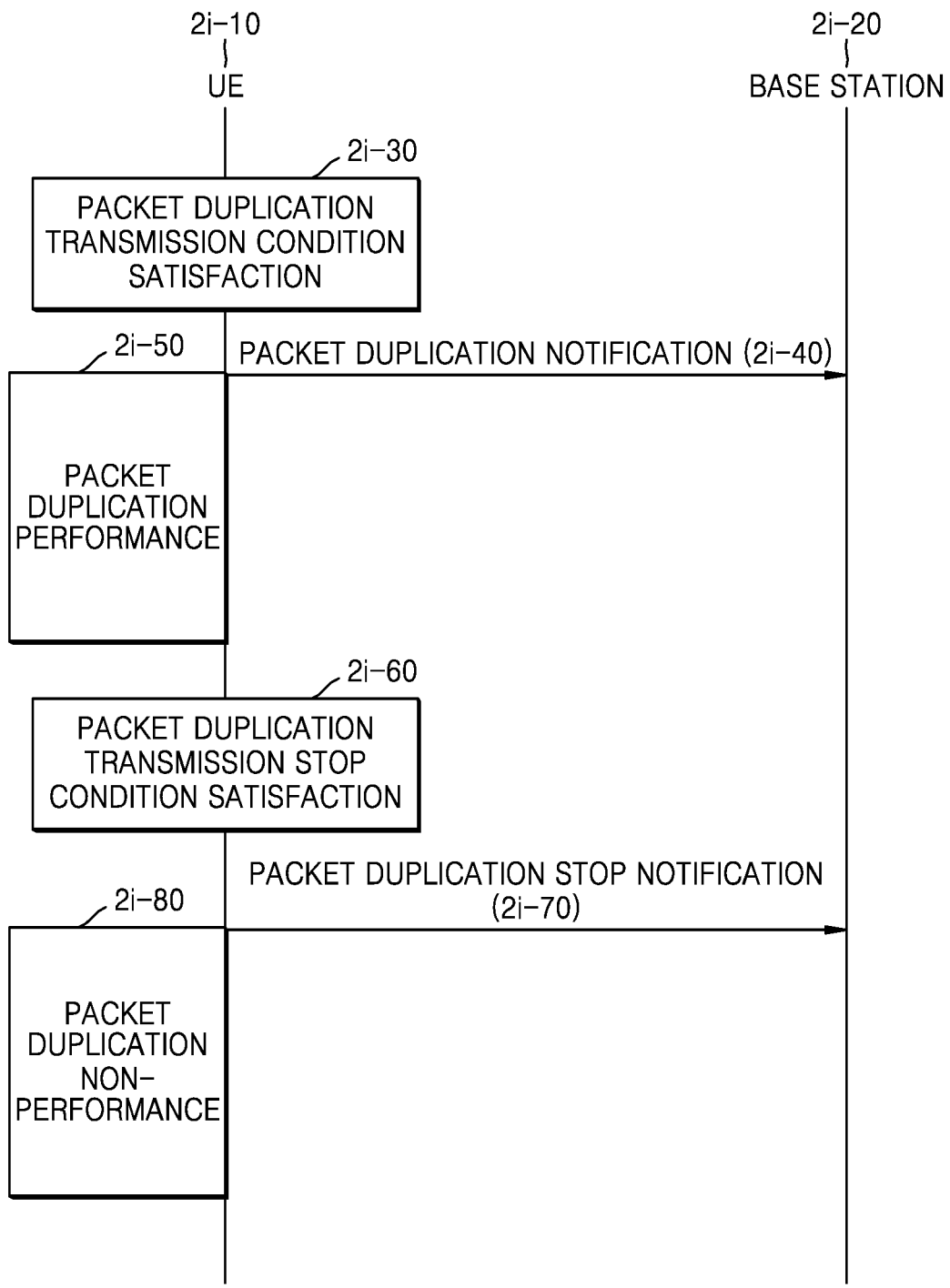
FIG. 2I illustrates a procedure of notifying a packet duplication activation state of a terminal according to an embodiment of the disclosure.

FIG. 2I illustrates a procedure of notifying a packet duplication activation state of a UE according to an embodiment of the disclosure.

Referring to FIG. 2I, when a UE 2i-10 has activated or deactivated packet duplication transmission under a configured or preconfigured condition or the like, a process of notifying the same to a base station 2i-20 may be necessary. When the configured or preconfigured packet duplication transmission condition is satisfied (2i-30), the UE 2i-10 may notify the base station 2i-20 that spontaneous packet duplication transmission of the UE 2i-10 has started (2i-40) and perform packet duplication transmission (2i-50). In this case, a message indicating that the spontaneous packet duplication transmission has been performed may include a radio bearer ID to indicate in which radio bearer the packet duplication transmission is being performed. According to an embodiment of the disclosure, a message indicating that the packet duplication transmission has been performed may include a logical channel identifier corresponding to an RLC entity to indicate the RLC entity in which the packet duplication transmission is being performed. Also, the message indicating that packet duplication transmission has been performed may include information indicating which packet duplication transmission condition has been satisfied or may include the measurement result of each RLC entity or the measurement result of the radio bearer. In the embodiment of FIG. 2I, the packet duplication notification (2i-40) and packet duplication performance (2i-50) may be started at the same time or may be performed sequentially at similar times.

When satisfying the packet duplication transmission stop condition (2i-60) while performing packet duplication transmission (2i-50), the UE may transmit a packet duplication stop notification message to the base station (2i-70) and may no longer perform packet duplication transmission (2i-80). Here, the packet duplication transmission stop condition (2i-60) may be the opposite condition of the packet duplication transmission condition (2i-30) or may be another preconfigured condition. A message (2i-70) indicating that spontaneous packet duplication transmission has been stopped may include a radio bearer ID to indicate in which radio bearer the packet duplication transmission is stopped. According to an embodiment of the disclosure, the message may include a logical channel identifier corresponding to an RLC entity to notify the RLC entity in which the packet duplication transmission is being performed or is stopped. Also, the message may include information indicating which packet duplication transmission stop condition has been satisfied or may include the measurement result of each RLC entity or the measurement result of the radio bearer. In FIG. 2I, the packet duplication stop notification (2i-70) and the packet duplication non-performance operation (2i-80) may be started at the same time or may be performed sequentially at similar times.

Figure 2J:
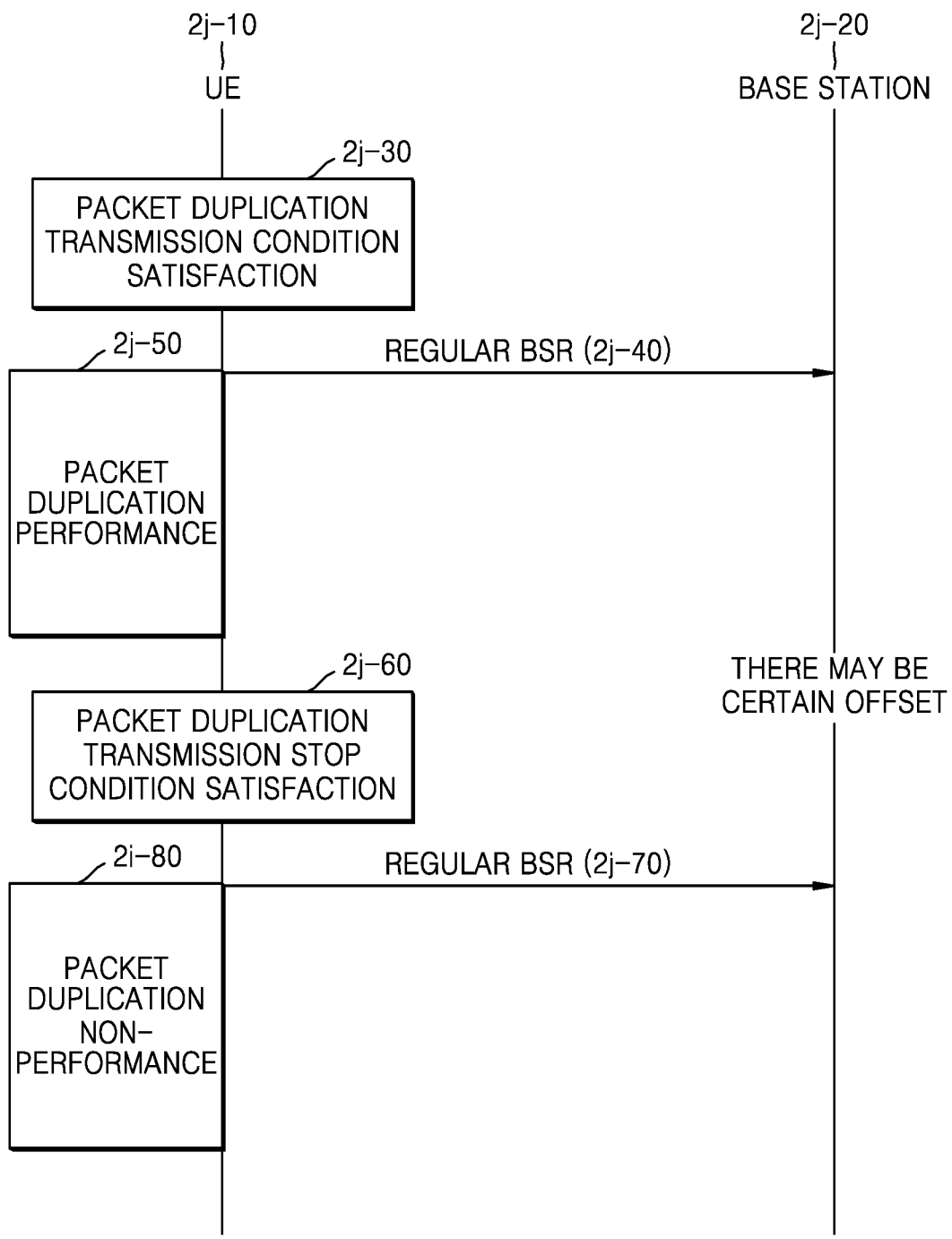
FIG. 2J illustrates a procedure of triggering a regular buffer status report (BSR) according to spontaneous packet duplication activation of a UE according to an embodiment of the disclosure.

FIG. 2J illustrates a procedure of triggering a regular buffer status report (BSR) according to spontaneous packet duplication activation of a UE according to an embodiment of the disclosure.

Referring to FIG. 2J, when a UE 2j-10 has activated or deactivated packet duplication transmission under a configured or preconfigured condition or the like, a process of requesting a base station 2j-20 to allocate a radio resource for packet duplication transmission may be necessary. When the UE 2j-10 satisfies the preconfigured packet duplication transmission condition (2j-30), the UE 2j-10 may trigger a regular buffer status report (BSR) to transmit a regular BSR to the base station 2j-20 (2j-40) and perform packet duplication transmission (2j-50). In FIG. 2J, the triggering and transmission of the regular BSR (2j-40) and the packet duplication performance (2j-50) may be started at the same time or may be performed sequentially at similar times. Thereafter, when the UE 2*j*-10 satisfies a packet duplication transmission stop condition (2*j*-60) while performing packet duplication transmission (2*j*-50), the UE 2*j*-10 may trigger a regular BSR and transmit the regular BSR to the base station 2*j*-20 (2*j*-70) in order to notify the base UE 2*j*-20 that the allocation of a radio resource for packet duplication transmission is no longer required and may no longer perform packet duplication transmission (2*j*-80). Here, the packet duplication transmission stop condition (2*i*-60) may be the opposite condition of the packet duplication transmission condition (2*i*-30) or may be another configured or preconfigured condition. In FIG. 2J, the triggering and transmission of the regular BSR (2*j*-70) and the packet duplication non-performance operation (2*j*-80) may be started at the same time or may be performed sequentially at similar times.

Figure 2K:
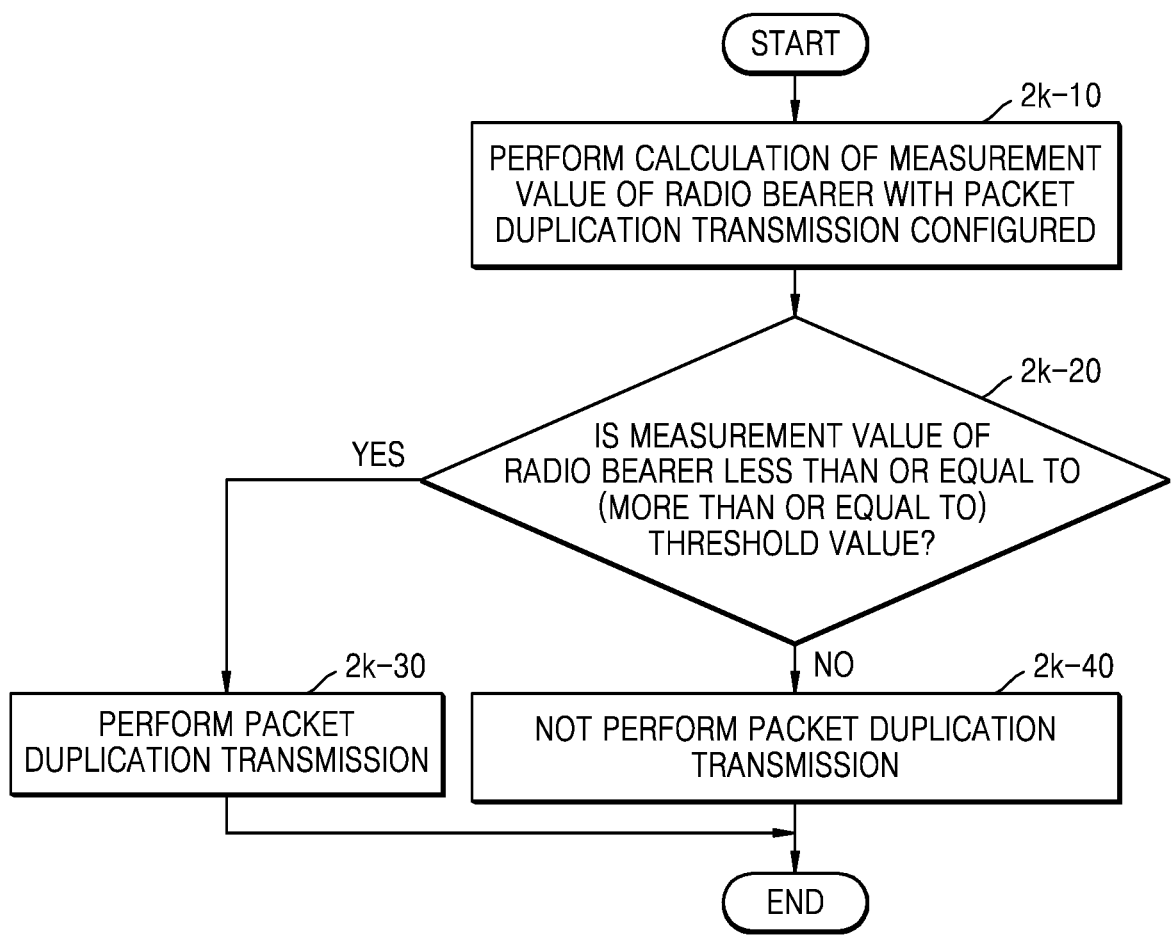
FIG. 2K is a flowchart illustrating a method of a UE performing spontaneous packet duplication transmission according to an embodiment of the disclosure.

FIG. 2K is a flowchart illustrating a method of a UE performing spontaneous packet duplication transmission according to an embodiment of the disclosure.

Referring to FIG. 2K, the UE may determine whether to perform packet duplication transmission by itself by using the measurement value of the radio bearer described above. When packet duplication transmission is configured in a certain radio bearer, the UE may perform calculation of the measurement value of the radio bearer in which the packet duplication transmission is configured at operation 2*k*-10. The above-described method may be used for the calculation of the measurement value. In this case, the UE may determine whether the measurement value of the radio bearer is less than, more than, or equal to a configured or preconfigured threshold value at operation 2*k*-20. Also, when the measurement value of the radio bearer is less than, more than, or equal to a configured or preconfigured threshold value, the UE may perform packet duplication transmission at operation 2*k*-30. When the measured value of the radio bearer does not satisfy the condition of operation 2*k*-20, packet duplication transmission may not be performed at operation 2*k*-40. That is, the UE may perform packet duplication transmission only when packet duplication transmission is required. Here, when the UE does not perform packet duplication transmission, the packet may be transmitted only to a preconfigured primary RLC entity or the packet may be transmitted to any one RLC entity among the configured RLC entities. When the packet duplication transmission is deactivated, when a split bearer operation should be performed, threshold-based data transmission may be performed for the operation of a split bearer by using one MCG RLC and one SCG RLC.

Figure 2L:
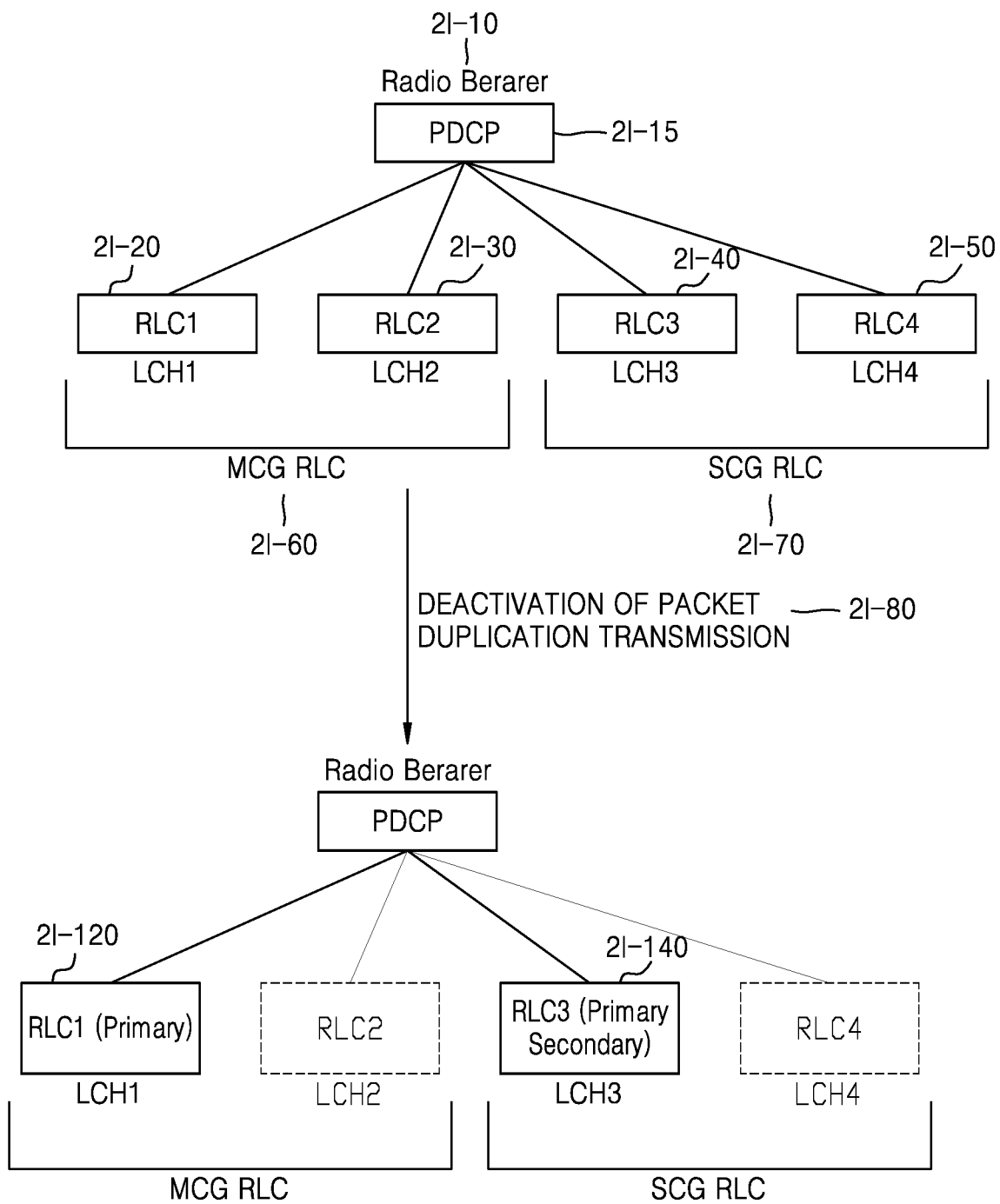
FIG. 2L illustrates a split bearer operation when packet duplication transmission is deactivated according to an embodiment of the disclosure.

FIG. 2L illustrates a split bearer operation when packet duplication transmission is deactivated according to an embodiment of the disclosure.

Referring to FIG. 2L, an embodiment of FIG. 2L may be applicable not only for spontaneous packet duplication transmission of the UE, but also for deactivation of packet duplication transmission under the control of the base station. Referring to FIG. 2L, it is assumed that a radio bearer 2*l*-10 includes a total of four RLC entities 2*l*-20, 2*l*-30, 2*l*-40, and 2*l*-50 configured for the radio bearer 2*l*-10 in which packet duplication is configured, and a PDCP 2*l*-15. It is assumed that among them, the RLC 1 (2*l*-20) and the RLC 2 (2*l*-30) are an MCG RLC (2*l*-60) configured in the MCG, and the RLC 3 (2*l*-40) and the RLC 4 (2*l*-50) are an SCG RLC (2*l*-70) configured in the SCG. When the packet duplication transmission is deactivated (2*l*-80), the corresponding radio bearer may return to a split bearer operation. Here, the split bearer may mean a radio bearer including one MCG RLC and one SCG RLC. Thus, one MCG RLC and one SCG RLC should be selected.

For this purpose, a primary RLC 2*l*-120 and a secondary RLC 2*l*-140 may be configured. The primary RLC 2*l*-120 may mean an RLC entity that may always be used for packet transmission. The secondary RLC 2*l*-140 may mean an RLC entity that is used for transmission when there is data more than or equal to a threshold value of the split bearer. Other RLC entities other than the primary RLC entity 2*l*-120 or the secondary RLC entity 2*l*-140 may not be used for packet transmission when the packet duplication transmission is deactivated. The primary RLC 2*l*-120 and the secondary RLC 2*l*-140 may be RLC entities belonging to different cell groups. The primary RLC 2*l*-120 and the secondary RLC 2*l*-140 may be configured at the time of RRC configuration from the base station or may be configured according to a predetermined rule. When the RLC entity is not configured at the time of RRC configuration from the base station, the primary RLC 2*l*-120 and the secondary RLC 2*l*-140 may be configured in ascending order (or descending order) of logical channel identifier values. According to an embodiment of the disclosure, an RLC entity capable of using a PCell or a PSCell may be configured as the primary RLC 2*l*-120 or the secondary RLC 2*l*-140. Also, an RLC entity that is not used for a split bearer operation although configured as an RLC entity may be referred to as a secondary RLC.

Figure 2M:
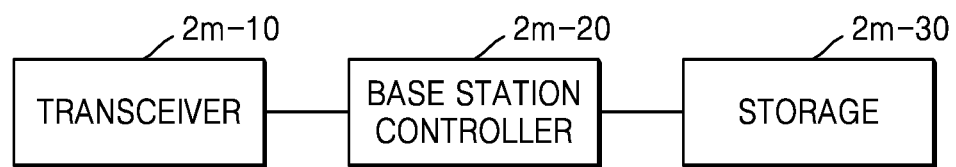
FIG. 2M is a block diagram illustrating a structure of a base station according to an embodiment of the disclosure.

FIG. 2M is a block diagram illustrating a structure of a base station according to an embodiment of the disclosure.

Referring to FIG. 2M, the base station may include a transceiver 2*m*-10, a base station controller 2*m*-20, and storage 2*m*-30. In the disclosure, the base station controller 2*m*-20 may be defined as a circuit, an application-specific integrated circuit, or at least one processor.

The transceiver 2*m*-10 may exchange signals with other network entities. For example, the transceiver 2*m*-10 may transmit system information to the UE and may transmit a synchronization signal or a reference signal therefrom.

The base station controller 2*m*-20 may control overall operations of the base station according to an embodiment of the disclosure. For example, the base station controller 2*m*-20 may control a signal flow between the respective blocks to perform an operation according to the flowcharts described above. According to an embodiment of the disclosure, the base station controller 2*m*-20 may configure a radio bearer for performing packet duplication transmission to the UE and may control the component of the base station to indicate whether the UE will perform spontaneous packet duplication transmission under a certain condition.

The storage 2*m*-30 may store at least one of information transmitted or received through the transceiver 2*m*-10 or information generated through the base station controller 2*m*-20.

Figure 2N:
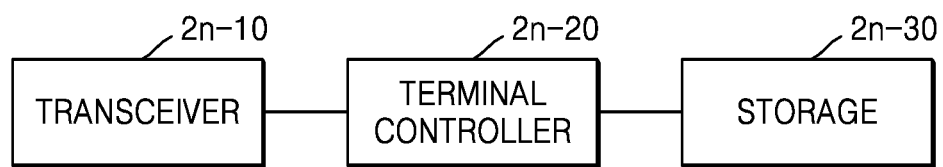
FIG. 2N is a block diagram illustrating a structure of a UE according to an embodiment of the disclosure.

FIG. 2N is a block diagram illustrating a structure of a UE according to an embodiment of the disclosure.

Referring to FIG. 2N, the UE may include a transceiver 2*n*-10, a terminal controller 2*n*-20, and storage 2*n*-30. In the disclosure, the terminal controller 2*n*-20 may be defined as a circuit, an application-specific integrated circuit, or at least one processor.

The transceiver 2*n*-10 may exchange signals with other network entities. For example, the transceiver 2*n*-10 may receive system information from the base station and may receive a synchronization signal or a reference signal therefrom.

The terminal controller 2*n*-20 may control an overall operation of the UE according to an embodiment of the disclosure. For example, the terminal controller 2n-20 may control a signal flow between the respective blocks to perform an operation according to the flowchart described above. According to an embodiment of the disclosure, the terminal controller 2n-20 may perform calculation of a measurement value of a radio bearer in which packet duplication transmission is configured and may control the components of the UE to perform or not to perform packet duplication transmission based on the measurement value.

The storage 2n-30 may store at least one of information transmitted or received through the transceiver 2n-10 or information generated through the terminal controller 2n-20.

The methods according to the embodiments of the disclosure described in the specification or the claims may be implemented by hardware, software, or a combination thereof.

When the methods are implemented by software, a non-transitory computer-readable storage medium or a computer program product may be provided to store one or more programs (software modules). The one or more programs stored in the computer-readable storage medium or the computer program product may be configured for execution by one or more processors in an electronic device. The one or more programs may include instructions for causing the electronic device to execute the methods according to the embodiments of the disclosure described in the specification or the claims.

These programs (software modules or software) may be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Also, the programs may be stored in a memory configured by a combination of some or all of such storage devices. Also, each of the memories may be provided in plurality.

The programs may be stored in an attachable storage device that may be accessed through a communication network such as Internet, Intranet, local area network (LAN), wide LAN (WLAN), or storage area network (SAN), or through a communication network configured by any combination thereof. Such a storage device may be connected through an external port to an apparatus performing an embodiment of the disclosure. Also, a separate storage device on a communication network may be connected to an apparatus performing an embodiment of the disclosure.

In the above particular embodiments of the disclosure, the components included in the disclosure are expressed as singular or plural according to the presented particular embodiments of the disclosure. However, the singular or plural expressions are selected according to the presented situations for convenience of description, and the disclosure is not limited to the singular or plural components. The components expressed in the plural may even be configured in the singular or the components expressed in the singular may even be configured in the plural.

The described embodiments provide apparatuses and methods capable of effectively providing services in wireless communication systems.

It should be understood that the embodiments of the disclosure described herein should be considered in a descriptive sense only, and not for purposes of limitation. Also, the embodiments of the disclosure may be operated in combination when necessary. For example, portions of an embodiment and another embodiment of the disclosure may be combined with each other. Also, embodiments of the disclosure may be implemented in other systems such as LTE systems, 5G or NR systems, and other modifications may be made therein based on the spirit of the above embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   receiving a radio resource control (RRC) message;
   identifying whether a secondary radio link control (RLC) entity for returning to a split bearer operation is configured by information included in the RRC message and identifying whether an amount of data associated with a primary RLC entity and the secondary RLC entity is equal to or larger than a threshold related to the split bearer operation, in case that more than two RLC entities are associated with a packet data convergence protocol (PDCP) entity of the UE and a packet duplication is deactivated; and
   transmitting a PDCP protocol data unit (PDU) using the primary RLC entity or the secondary RLC entity based on the amount of data associated with the primary RLC entity and the secondary RLC entity being equal to or larger than the threshold related to the split bearer operation and the secondary RLC entity for returning to the split bearer operation being configured by the information included in the RRC message,
   wherein the primary RLC entity belongs to a cell group different from a cell group of the secondary RLC entity.

2. The method of claim 1, further comprising:
   based on the amount of data associated with the primary RLC entity and the secondary RLC entity being less than the threshold related to the split bearer operation, transmitting the PDCP PDU using the primary RLC entity.

3. The method of claim 1, wherein the RRC message further includes information related to the primary RLC entity.

4. The method of claim 1, wherein the primary RLC entity is associated with a master cell group (MCG) and the secondary RLC entity is associated with a secondary cell group (SCG).

5. The method of claim 1, further comprising:
   performing the packet duplication using at least two RLC entities among the more than two RLC entities.

6. A user equipment (UE) configured to operate in a wireless communication system, the UE comprising:
   a transceiver; and
   at least one processor coupled to the transceiver and configured to:
      receive a radio resource control (RRC) message,
      identify whether a secondary radio link control (RLC) entity for returning to a split bearer operation is configured by information included in the RRC message and identify whether an amount of data associated with a primary RLC entity and the secondary RLC entity is equal to or larger than a threshold related to the split bearer operation, in case that more than two RLC entities are associated with a packet data convergence protocol (PDCP) entity of the UE and a packet duplication is deactivated, and transmit a PDCP protocol data unit (PDU) using the primary RLC entity or the secondary RLC entity based on the amount of data associated with the primary RLC entity and the secondary RLC entity being equal to or larger than the threshold related to the split bearer operation and the secondary RLC entity for returning to the split bearer operation being configured by the information included in the RRC message, wherein the primary RLC entity belongs to a cell group different from a cell group of the secondary RLC entity.

7. The UE of claim 6, wherein the at least one processor is further configured to:

based on the amount of data associated with the primary RLC entity and the secondary RLC entity being less than the threshold related to the split bearer operation, transmit the PDCP PDU using the primary RLC entity.

8. The UE of claim 6, wherein the RRC message further includes information related to the primary RLC entity.

9. The UE of claim 6, wherein the primary RLC entity is associated with a master cell group (MCG) and the secondary RLC entity is associated with a secondary cell group (SCG).

10. The UE of claim 6, wherein the at least one processor is further configured to:

perform the packet duplication using at least two RLC entities among the more than two RLC entities.

11. A method performed by a base station in a wireless communication system, the method comprising:

transmitting, to a user equipment (UE), a radio resource control (RRC) message, wherein whether a secondary radio link control (RLC) entity for returning to a split bearer operation is configured by information included in the RRC message is identified at the UE and whether an amount of data associated with a primary RLC entity and the secondary RLC entity is equal to or larger than a threshold related to the split bearer operation is identified at the UE, in case that more than two RLC entities are associated with a packet data convergence protocol (PDCP) entity and a packet duplication is deactivated, wherein a PDCP protocol data unit (PDU) is transmitted at the UE using the primary RLC entity or the secondary RLC entity based on the amount of data associated with the primary RLC entity and the secondary RLC entity being equal to or larger than the threshold related to the split bearer operation and the secondary RLC entity for returning to the split bearer operation being configured by the information included in the RRC message, and wherein the primary RLC entity belongs to a cell group different from a cell group of the secondary RLC entity.

12. The method of claim 11, wherein based on the amount of data associated with the primary RLC entity and the secondary RLC entity being less than the threshold related to the split bearer operation, the PDCP PDU is transmitted at the UE using the primary RLC entity.

13. The method of claim 11, wherein the RRC message further includes information related to the primary RLC entity.

14. The method of claim 11, wherein the primary RLC entity is associated with a master cell group (MCG) and the secondary RLC entity is associated with a secondary cell group (SCG).

15. The method of claim 11, wherein the packet duplication is performed at the UE using at least two RLC entities among the more than two RLC entities.

16. A base station configured to operate in a wireless communication system, the base station comprising:

a transceiver; and at least one processor coupled to the transceiver and configured to:

transmit, to a user equipment (UE), a radio resource control (RRC) message, wherein whether a secondary radio link control (RLC) entity for returning to a split bearer operation is configured by information included in the RRC message is identified at the UE and whether an amount of data associated with a primary RLC entity and the secondary RLC entity is equal to or larger than a threshold related to the split bearer operation is identified at the UE, in case that more than two RLC entities are associated with a packet data convergence protocol (PDCP) entity and a packet duplication is deactivated, wherein a PDCP protocol data unit (PDU) is transmitted at the UE using the primary RLC entity or the secondary RLC entity based on the amount of data associated with the primary RLC entity and the secondary RLC entity being equal to or larger than the threshold related to the split bearer operation and the secondary RLC entity for returning to the split bearer operation being configured by the information included in the RRC message, and wherein the primary RLC entity belongs to a cell group different from a cell group of the secondary RLC entity.

17. The base station of claim 16, wherein based on the amount of data associated with the primary RLC entity and the secondary RLC entity being less than the threshold related to the split bearer operation, the PDCP PDU is transmitted at the UE using the primary RLC entity.

18. The base station of claim 16, wherein the RRC message further includes information related to the primary RLC entity.

19. The base station of claim 16, wherein the primary RLC entity is associated with a master cell group (MCG) and the secondary RLC entity is associated with a secondary cell group (SCG).

20. The base station of claim 16, wherein the packet duplication is performed at the UE using at least two RLC entities among the more than two RLC entities.

* * * * *